(12) United States Patent
Ono

(10) Patent No.: US 11,913,193 B2
(45) Date of Patent: Feb. 27, 2024

(54) SHOVEL, INFORMATION PROCESSING DEVICE, INFORMATION PROCESSING METHOD, AND NON-TRANSITORY STORAGE MEDIUM

(71) Applicant: SUMITOMO HEAVY INDUSTRIES, LTD., Tokyo (JP)

(72) Inventor: Tetsuji Ono, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 790 days.

(21) Appl. No.: 17/018,135

(22) Filed: Sep. 11, 2020

(65) Prior Publication Data

US 2021/0002862 A1    Jan. 7, 2021

Related U.S. Application Data

(63) Continuation of application No. PCT/JP2019/011821, filed on Mar. 20, 2019.

(30) Foreign Application Priority Data

Mar. 20, 2018    (JP) .................................. 2018-053222

(51) Int. Cl.
*E02F 9/00*    (2006.01)
*E02F 9/24*    (2006.01)
(Continued)

(52) U.S. Cl.
CPC ............ *E02F 9/2033* (2013.01); *B60K 35/00* (2013.01); *E02F 9/24* (2013.01); *E02F 9/26* (2013.01);
(Continued)

(58) Field of Classification Search
CPC ... E02F 9/2033; E02F 9/24; E02F 9/26; E02F 3/32; E02F 9/2228; E02F 9/2235;
(Continued)

(56) References Cited

U.S. PATENT DOCUMENTS

| 8,768,581 | B2 | 7/2014 | Mizuochi et al. | |
|---|---|---|---|---|
| 9,518,370 | B2 | 12/2016 | Tsukamoto | |
| 2003/0147727 | A1* | 8/2003 | Fujishima | H04Q 9/10 414/200 |

FOREIGN PATENT DOCUMENTS

| JP | H05-319785 | 12/1993 |
|---|---|---|
| JP | 2008-009935 | 1/2008 |

(Continued)

OTHER PUBLICATIONS

International Search Report for PCT/JP2019/011821 dated May 21, 2019.

*Primary Examiner* — Yonel Beaulieu
(74) *Attorney, Agent, or Firm* — IPUSA, PLLC

(57) ABSTRACT

A shovel includes a lower traveling body; an upper turning body pivotably attached to the lower traveling body; an attachment attached to the upper turning body; and a processor that stores in a memory, or transmits to an external device, log information including information on the shovel and information on a peripheral environment of the shovel upon detecting that a degree of stability on a motion of the shovel becomes less than a predetermined reference level, or upon detecting an indication that the degree of stability on the motion of the shovel becomes lower than the predetermined reference level.

15 Claims, 25 Drawing Sheets

(51) Int. Cl.
  *E02F 9/26* (2006.01)
  *E02F 3/32* (2006.01)
  *G07C 5/00* (2006.01)
  *B60K 35/00* (2006.01)
  *E02F 9/20* (2006.01)
  *G07C 5/08* (2006.01)
  *E02F 9/22* (2006.01)

(52) U.S. Cl.
  CPC ...... *G07C 5/0816* (2013.01); *B60K 2370/152* (2019.05); *B60K 2370/16* (2019.05); *E02F 3/32* (2013.01); *E02F 9/2228* (2013.01); *E02F 9/2235* (2013.01); *E02F 9/2285* (2013.01); *E02F 9/2292* (2013.01); *E02F 9/2296* (2013.01)

(58) Field of Classification Search
  CPC ..... E02F 9/2285; E02F 9/2292; E02F 9/2296; E02F 9/2054; E02F 9/265; E02F 9/268; E02F 9/262; E02F 9/2095; B60K 35/00; B60K 2370/152; B60K 2370/16; G07C 5/0816; G01C 1/00
  See application file for complete search history.

(56) References Cited

FOREIGN PATENT DOCUMENTS

| | | |
|---|---|---|
| JP | 2009-197436 | 9/2009 |
| JP | 2014-122510 | 7/2014 |
| JP | 2016-172963 | 9/2016 |
| JP | 2016-173032 | 9/2016 |
| JP | 2017-166232 | 9/2017 |
| JP | 2018-003282 | 1/2018 |
| WO | 2011/148946 | 12/2011 |

* cited by examiner

FIG.3

LOG INFORMATION RETRIEVING TIMING: PRIOR TO OCCURRENCE OF UNSTABLE STATE, DURING UNSTABLE STATE, AFTER OCCURRENCE OF UNSTABLE STATE

| | | | |
|---|---|---|---|
| SURROUNDING ENVIRONMENT INFORMATION | DATETIME INFORMATION | | DATE, DAY OF THE WEEK, TIME |
| | WEATHER INFORMATION | | FINE/CLOUDY/RAINY/SNOW, etc. |
| | POSITION INFORMATION | | LATITUDE, LONGITUDE, OR GEO CODE (e.g., GeoHash), etc. |
| | PERIPHERAL STATUS DETAILED INFORMATION | IMAGE INFORMATION | IMAGE CAPTURED BY IMAGE CAPTURING DEVICE FOR PERIPHERAL MONITORING CONTROL |
| | | TOPOGRAPHIC INFORMATION | THREE-DIMENSIONAL TOPOGRAPHICAL INFORMATION, TOPOGRAPHICAL META INFORMATION INDICATING TOPOGRAPHICAL FEATURES OF WORK SURFACE (e.g., A LARGE NUMBER OF SMALL RECESSES) |
| | | PERIPHERAL MONITORING CONTROL INFORMATION | PERIPHERAL MONITORING CONTROL OPERATION STATUS (PRESENCE OR ABSENCE OF THE FUNCTION, AND ON/OFF STATE), DETECTION INFORMATION OF MONITORING TARGET |
| SHOVEL RELATED INFORMATION | SHOVEL SPECIFIC INFORMATION | SHOVEL IDENTIFICATION INFORMATION | PREREGISTERED MACHINE NUMBER, SHOVEL ID, etc. |
| | OPERATOR INFORMATION | OPERATOR SPECIFIC INFORMATION / OPERATOR IDENTIFICATION INFORMATION | PREREGISTERED OPERATOR ID, etc. |
| | | OPERATOR STATUS INFORMATION / OPERATOR BIOMETRIC INFORMATION | ELECTROCARDIOGRAM, ELECTROENCEPHALOGRAM, etc. |
| | SHOVEL STATUS INFORMATION | OPERATION MODE INFORMATION | SP MODE, H MODE, A MODE, etc. |
| | | ENGINE REVOLUTION PER MINUTE INFORMATION | SET VALUE OR MEASURED VALUE OF ENGINE REVOLUTION PER MINUTE |
| | | WORK TYPE INFORMATION | EXCAVATION/LEVELING/AERIAL/SOIL REMOVAL, etc. |
| | | UNSTABLE STATE TYPE INFORMATION | FORWARD SLIDING/BACKWARD SLIDING/FRONT LIFT/REAR LIFT/OSCILLATION, etc. |
| | | STABILITY INFORMATION | FOR EXAMPLE, AN INDEX VALUE REPRESENTING STABILITY OF A SHOVEL'S MOTION (STABILITY INDEX VALUE) |
| | | VEHICLE BODY TILT STATE INFORMATION | FOR EXAMPLE, TILT ANGLE OF UPPER TURNING BODY IN FRONT-REAR DIRECTION (EXTENSION DIRECTION OF ATTACHMENT) |
| | | CRAWLER ORIENTATION INFORMATION | RELATIVE ORIENTATION OF CRAWLER WITH RESPECT TO TURNING BODY (EXTENSION DIRECTION OF ATTACHMENT) |
| | | ATTACHMENT POSTURE INFORMATION | FOR EXAMPLE, POSTURE ANGLE (BOOM ANGLE, ARM ANGLE, BUCKET ANGLE), ACCELERATION/ANGULAR ACCELERATION (BOOM, ARM, BUCKET), BUCKET POSITION |
| | | ATTACHMENT DRIVING STATE | FOR EXAMPLE, CYLINDER PRESSURE OF BOOM CYLINDER, ARM CYLINDER, BUCKET CYLINDER (ROD SIDE HYDRAULIC CHAMBER & BOTTOM HYDRAULIC CHAMBER) |
| | | OPERATION STATE INFORMATION | TRAVELING, BOOM, ARM, BUCKET (TURN) |
| | | STABILIZATION CONTROL INFORMATION | ON/OFF OF STABILIZATION CONTROL, PRESENCE/ABSENCE OF OPERATION, DETAILS OF CONTROL (TYPE) DURING OPERATION, CONTROL AMOUNT DURING OPERATION, ETC. |

FIG.4A

| TIME OF OCCURRENCE OF UNSTABLE STATE/INDICATION ||||||||||||||||||
|---|---|---|---|---|---|---|---|---|---|---|---|---|---|---|---|---|
| SURROUNDING ENVIRONMENT INFORMATION |||||||| SHOVEL RELATED INFORMATION |||||||||
| DATETIME INFORMATION || WEATHER INFOR- MATION | POSITION INFOR- MATION || PERIPHERAL STATUS DETAILED INFORMATION ||| SHOVEL SPECIFIC INFOR- MATION | OPERATOR INFORMATION ||| SHOVEL STATUS INFORMATION |||||
| DAY OF THE WEEK / TIME | | | | | IMAGE INFOR- MATION | TOPO- GRAPHIC INFOR- MATION | PERIPHERAL MONITORING CONTROL INFORMATION || SHOVEL IDENTI- FICATION INFOR- MATION | OPERATOR SPECIFIC INFORMATION / OPERATOR IDENTI- FICATION INFOR- MATION | OPERATOR STATUS INFORMATION / OPERATOR BIOMETRIC INFORMATION || OPERA- TION MODE | ENGINE REVOLU- TION PER MINUTE | WORK TYPE | UN- STABLE TYPE | STA- BILITY INFOR- MATION | VEHICLE BODY TILT STATE INFOR- MATION | CRAWLER ORIEN- TATION INFOR- MATION |
| DATE | | | LAT. | LONG. | | | OPERA- TION STATE | DETEC- TION STATUS | | | ELECTRO- CARDIO- GRAM | ELECTRO- ENCEPH- ALOGRAM | | | | | | | |
| ... | ... | ... | ... | ... | ... | ... | ... | ... | ... | ... | ... | ... | ... | ... | ... | ... | ... | ... |
| Sept. 1 | Fri. 11:03 | RAINY | xxx | xxx | ○ | ○ | ON | None | SHOVEL A | OPERATOR A | ○ | ○ | SP | xxxx | EXCA- VATION | FRONT LIFT | xxx | 15° | 0° |
| Sept. 1 | Fri. 13:00 | FINE | xxx | xxx | ○ | ○ | ON | None | SHOVEL B | OPERATOR B | ○ | — | SP | xxxx | EXCA- VATION | BACKWARD SLIDING | xxx | 7° | 90° |
| ... | ... | ... | ... | ... | ... | ... | ... | ... | ... | ... | ... | ... | ... | ... | ... | ... | ... | ... |
| Sept. 4 | Mon. 10:50 | FINE | xxx | xxx | ○ | ○ | ON | Yes (2) | SHOVEL A | OPERATOR C | ○ | ○ | A | xxxx | AER- IAL | OSCIL- LATION | xxx | 2° | 27° |
| Sept. 4 | Mon. 14:30 | CLOUDY | xxx | xxx | ○ | ○ | OFF | — | SHOVEL B | OPERATOR B | ○ | — | H | xxxx | AER- IAL | REAR LIFT | xxx | 0° | 270° |
| ... | ... | ... | ... | ... | ... | ... | ... | ... | ... | ... | ... | ... | ... | ... | ... | ... | ... | ... |
| Sept. 5 | Tue. 13:24 | CLOUDY | xxx | xxx | — | — | — | — | SHOVEL C | OPERATOR A | — | — | H | xxxx | LEV- ELING | FRONT LIFT | xxx | 5° | 0° |
| Sept. 5 | Tue. 15:39 | FINE | xxx | xxx | ○ | ○ | OFF | — | SHOVEL B | OPERATOR C | ○ | — | H | xxxx | EXCA- VATION | FORWARD SLIDING | xxx | 0° | 0° |
| ... | ... | ... | ... | ... | ... | ... | ... | ... | ... | ... | ... | ... | ... | ... | ... | ... | ... | ... |

FIG.4B

| TIME OF OCCURRENCE OF UNSTABLE STATE/INDICATION | | | | | | | | | | | | | | | | | | | | | |
|---|---|---|---|---|---|---|---|---|---|---|---|---|---|---|---|---|---|---|---|---|---|
| SHOVEL RELATED INFORMATION | | | | | | | | | | | | | | | | | | | | | |
| SHOVEL STATUS INFORMATION | | | | | | | | | | | | | | | | | | | | STABILIZATION CONTROL INFORMATION | |
| ATTACHMENT POSTURE STATE | | | ATTACHMENT DRIVING STATE | | | | | | OPERATION STATE | | | | | | | | | | OPERATING STATE | CONTROL STATE | |
| BOOM ANGLE | ARM ANGLE | BUCKET ANGLE | BUCKET POSITION | | BOOM CYLINDER PRESSURE | | ARM CYLINDER PRESSURE | | BUCKET CYLINDER PRESSURE | | TRAVELING | | TURN | | BOOM | | ARM | | BUCKET | | | BOOM (CONTROL AMOUNT) | ARM (CONTROL AMOUNT) |
| | | | DISTANCE | HEIGHT | ROD | BOTTOM | ROD | BOTTOM | ROD | BOTTOM | DIRECTION | OPERATION AMOUNT | DIRECTION | OPERATION AMOUNT | DIRECTION | OPERATION AMOUNT | DIRECTION | OPERATION AMOUNT | DIRECTION | OPERATION AMOUNT | | | |
| ... | ... | ... | ... | ... | ... | ... | ... | ... | ... | ... | ... | ... | ... | ... | ... | ... | ... | ... | ... | ... | ... | ... | ... |
| 15° | 20° | 15° | xxx | xxx | xxx | xxx | xxx | xxx | xxx | xxx | NEUTRAL | – | NEUTRAL | – | RAISE | xxx (LARGE) | CLOSE | xxx (LARGE) | NEUTRAL | – | LIFTING SUPPRESSION | xxx | – |
| xxx | xxx | xxx | xxx | xxx | xxx | xxx | xxx | xxx | xxx | xxx | NEUTRAL | – | NEUTRAL | – | NEUTRAL | – | CLOSE | xxx (LARGE) | NEUTRAL | – | SLIP SUPPRESSION | xxx | – |
| ... | ... | ... | ... | ... | ... | ... | ... | ... | ... | ... | ... | ... | ... | ... | ... | ... | ... | ... | ... | ... | ... | ... | ... |
| xxx | xxx | xxx | xxx | xxx | xxx | xxx | xxx | xxx | xxx | xxx | NEUTRAL | – | RIGHT | xxx (MIDDLE) | NEUTRAL | – | OPEN | xxx (MIDDLE) | xxx (MIDDLE) | OSCILLATION SUPPRESSION | xxx | – |
| xxx | xxx | xxx | xxx | xxx | xxx | xxx | xxx | xxx | xxx | xxx | NEUTRAL | – | NEUTRAL | – | RAISE | xxx (LARGE) | NEUTRAL | – | NEUTRAL | – | INACTIVE | xxx | – |
| ... | ... | ... | ... | ... | ... | ... | ... | ... | ... | ... | ... | ... | ... | ... | ... | ... | ... | ... | ... | ... | ... | ... | ... |
| xxx | xxx | xxx | xxx | xxx | xxx | xxx | xxx | xxx | xxx | xxx | NEUTRAL | – | NEUTRAL | – | NEUTRAL | – | CLOSE | xxx (MIDDLE) | NEUTRAL | – | OFF | – | – |
| xxx | xxx | xxx | xxx | xxx | xxx | xxx | xxx | xxx | xxx | xxx | NEUTRAL | – | NEUTRAL | – | NEUTRAL | – | CLOSE | xxx (MIDDLE) | CLOSE | xxx (SMALL) | OFF | – | – |
| ... | ... | ... | ... | ... | ... | ... | ... | ... | ... | ... | ... | ... | ... | ... | ... | ... | ... | ... | ... | ... | ... | ... | ... |

FIG.4C

| VEHI-CLE BODY TILT STATE | PRIOR TO OCCURRENCE OF UNSTABLE STATE/INDICATION ||||||||| AFTER OCCURRENCE OF UNSTABLE STATE/INDICATION |||||||||
| --- | --- | --- | --- | --- | --- | --- | --- | --- | --- | --- | --- | --- | --- | --- | --- | --- | --- |
| | SHOVEL RELATED INFORMATION ||||||||| SHOVEL STATUS INFORMATION |||||||||
| | SHOVEL STATUS INFORMATION ||||||||| OPERATION STATE |||||||||
| | OPERATION STATE ||||||||| TRAVELING || TURN || BOOM || ARM || BUCKET ||
| | TRAVELING || TURN || BOOM || ARM || BUCKET || VEHI-CLE BODY TILT STATE | DIREC-TION | OPER-ATION AMOUNT | DIREC-TION | OPER-ATION AMOUNT | DIREC-TION | OPER-ATION AMOUNT | DIREC-TION | OPER-ATION AMOUNT | DIREC-TION | OPER-ATION AMOUNT |
| | DIREC-TION | OPER-ATION AMOUNT | DIREC-TION | OPER-ATION AMOUNT | DIREC-TION | OPER-ATION AMOUNT | DIREC-TION | OPER-ATION AMOUNT | DIREC-TION | OPER-ATION AMOUNT | | | | | | | | | | |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 15 DE-GREES | NEU-TRAL | xxx | NEU-TRAL | xxx | NEU-TRAL | xxx | NEU-TRAL | xxx | NEU-TRAL | xxx | xxx | xxx | xxx | xxx | xxx | xxx | xxx | xxx | xxx |
| 15 DE-GREES | NEU-TRAL | xxx | NEU-TRAL | xxx | NEU-TRAL | xxx | NEU-TRAL | xxx | NEU-TRAL | xxx | xxx | xxx | xxx | xxx | xxx | xxx | xxx | xxx | xxx |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 15 DE-GREES | NEU-TRAL | xxx | NEU-TRAL | xxx | NEU-TRAL | xxx | NEU-TRAL | xxx | NEU-TRAL | xxx | xxx | xxx | xxx | xxx | xxx | xxx | xxx | xxx | xxx |
| 15 DE-GREES | NEU-TRAL | xxx | NEU-TRAL | xxx | NEU-TRAL | xxx | NEU-TRAL | xxx | NEU-TRAL | xxx | xxx | xxx | xxx | xxx | xxx | xxx | xxx | xxx | xxx |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 15 DE-GREES | NEU-TRAL | xxx | NEU-TRAL | xxx | NEU-TRAL | xxx | NEU-TRAL | xxx | NEU-TRAL | xxx | xxx | xxx | xxx | xxx | xxx | xxx | xxx | xxx | xxx |
| 15 DE-GREES | NEU-TRAL | xxx | NEU-TRAL | xxx | NEU-TRAL | xxx | NEU-TRAL | xxx | NEU-TRAL | xxx | xxx | xxx | xxx | xxx | xxx | xxx | xxx | xxx | xxx |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG.10
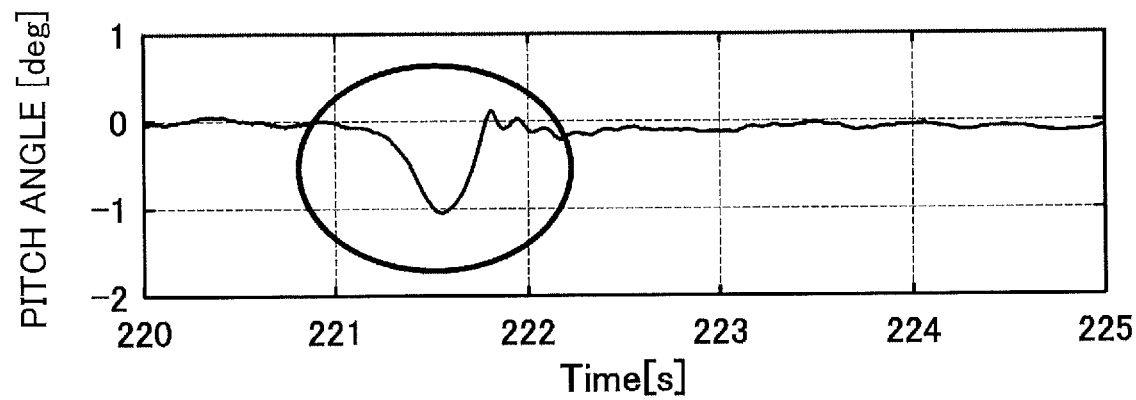
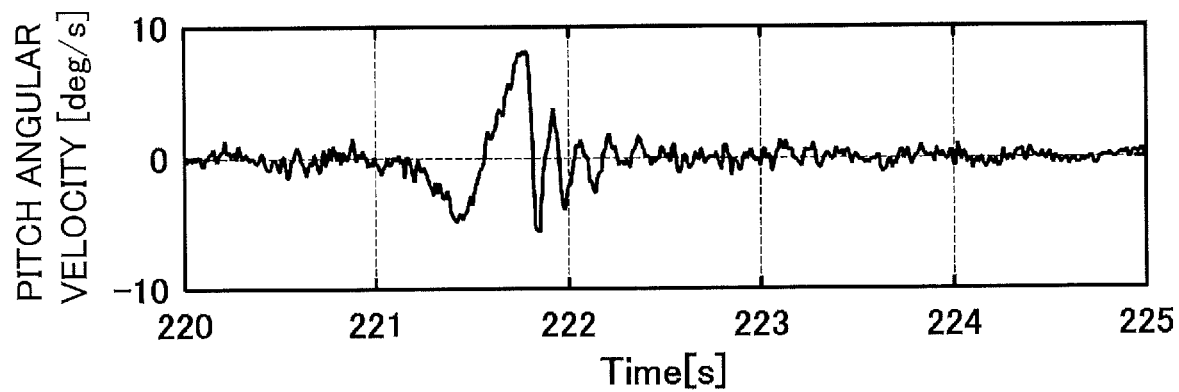

FIG.11

| OPERATOR A | SURROUNDING ENVIRONMENT INFORMATION | | | | TIME OF OCCURRENCE OF UNSTABLE STATE/INDICATION | | SHOVEL RELATED INFORMATION | | | | | CONTROL STATE (STABILIZATION CONTROL) |
|---|---|---|---|---|---|---|---|---|---|---|---|---|
| | DATETIME INFORMATION | | | WEATHER INFORMATION | WORK TYPE | UN-STABLE STATE TYPE | OPERATION STATE | | | | | OPERATING STATE |
| | DATE | DAY OF THE WEEK | TIME | | | | TRAVEL-ING | TURN | BOOM | ARM | BUCKET | |
| 1 | xxx | xxx | xxx | xxx | xxx | xxx | xxx | xxx | xxx | xxx | xxx | xxx |
| 2 | Sept. 1 | Fri. | 11:03 | RAINY | EXCAVATION | FRONT LIFT | NEU-TRAL | NEU-TRAL | RAISE (LARGE) | CLOSE (LARGE) | NEU-TRAL | LIFTING SUPPRESSION |
| 3 | Sept. 5 | Tue. | 13:24 | CLOUDY | LEVEL-ING | FRONT LIFT | NEU-TRAL | NEU-TRAL | NEU-TRAL | CLOSE (MIDDLE) | NEU-TRAL | OFF |
| 4 | xxx | xxx | xxx | xxx | xxx | xxx | xxx | xxx | xxx | xxx | xxx | xxx |
| 5 | xxx | xxx | xxx | xxx | xxx | xxx | xxx | xxx | xxx | xxx | xxx | xxx |
| 6 | xxx | xxx | xxx | xxx | xxx | xxx | xxx | xxx | xxx | xxx | xxx | xxx |
| 7 | xxx | xxx | xxx | xxx | xxx | xxx | xxx | xxx | xxx | xxx | xxx | xxx |
| 8 | xxx | xxx | xxx | xxx | xxx | xxx | xxx | xxx | xxx | xxx | xxx | xxx |
| 9 | xxx | xxx | xxx | xxx | xxx | xxx | xxx | xxx | xxx | xxx | xxx | xxx |
| 10 | xxx | xxx | xxx | xxx | xxx | xxx | xxx | xxx | xxx | xxx | xxx | xxx |
| ... | ... | ... | ... | ... | ... | ... | ... | ... | ... | ... | ... | ... |

EXTRACTION CONDITION:
FROM ... MONTH ...DAY TO ... MONTH ... DAY & SITE
(LOCATION INFORMATION: ...)

| STABILI-ZATION CONTROL | SLIP SUPPRESSION CONTROL | NUMBER OF TIMES OF OPERATION | | 44 |
|---|---|---|---|---|
| | | | FRONT | 25 |
| | | | REAR | 19 |
| | | NUMBER OF TIMES OF OCCURRENCE OF SLIP | | 54 |
| | | | FRONT | 29 |
| | | | REAR | 25 |
| | | OPERATION RATIO (%) | | 81% |
| | | | FRONT | 86% |
| | | | REAR | 76% |
| | LIFTING SUPPRESSION CONTROL | NUMBER OF TIMES OF OPERATION | | 72 |
| | | | FRONT | 40 |
| | | | REAR | 32 |
| | | NUMBER OF TIMES OF OCCURRENCE OF LIFTING | | 86 |
| | | | FRONT | 48 |
| | | | REAR | 38 |
| | | OPERATION RATIO (%) | | 84% |
| | | | FRONT | 83% |
| | | | REAR | 84% |
| | OSCILLATION SUPPRESSION CONTROL | NUMBER OF TIMES OF OPERATION | | 21 |
| | | NUMBER OF TIMES OF OCCURRENCE OF OSCILLATION | | 22 |
| | | OCCURRENCE RATIO OF OSCILLATION (%) | | 95% |

FIG.15

| EXTRACTION CONDITION: FROM ... MONTH ...DAY TO ... MONTH ... DAY & SITE (LOCATION INFORMATION: ...) | | | | |
|---|---|---|---|---|
| STABILITY INDEX VALUE | OPERATOR A | FORWARD SLIDING | DURING OPERATION | xxx |
| | | | DURING NON-OPERATION | xxx |
| | | | DEGREE OF DEVIATION | xxx % |
| | | BACK-WARD SLIDING | DURING OPERATION | xxx |
| | | | DURING NON-OPERATION | xxx |
| | | | DEGREE OF DEVIATION | xxx % |
| | | FRONT LIFT | DURING OPERATION | xxx |
| | | | DURING NON-OPERATION | xxx |
| | | | DEGREE OF DEVIATION | xxx % |
| | | REAR LIFT | DURING OPERATION | xxx |
| | | | DURING NON-OPERATION | xxx |
| | | | DEGREE OF DEVIATION | xxx % |
| | OPERATOR B | FORWARD SLIDING | DURING OPERATION | xxx |
| | | | DURING NON-OPERATION | xxx |
| | | | DEGREE OF DEVIATION | xxx % |
| | | BACK-WARD SLIDING | DURING OPERATION | xxx |
| | | | DURING NON-OPERATION | xxx |
| | | | DEGREE OF DEVIATION | xxx % |
| | | FRONT LIFT | DURING OPERATION | xxx |
| | | | DURING NON-OPERATION | xxx |
| | | | DEGREE OF DEVIATION | xxx % |
| | | REAR LIFT | DURING OPERATION | xxx |
| | | | DURING NON-OPERATION | xxx |
| | | | DEGREE OF DEVIATION | xxx % |

FIG.16

EXTRACTION CONDITION:
FROM ... MONTH ...DAY TO ... MONTH ... DAY & SITE
(LOCATION INFORMATION: ...)

| DEGREE OF CORRECTION OF MOTION (AVERAGE CONTROL AMOUNT) | OPERATOR A | SLIDING | FRONT | xxx |
| --- | --- | --- | --- | --- |
| | | | REAR | xxx |
| | | LIFT | FRONT | xxx |
| | | | REAR | xxx |
| | OPERATOR B | SLIDING | FRONT | xxx |
| | | | REAR | xxx |
| | | LIFT | FRONT | xxx |
| | | | REAR | xxx |
| | OPERATOR C | SLIDING | FRONT | xxx |
| | | | REAR | xxx |
| | | LIFT | FRONT | xxx |
| | | | REAR | xxx |

SHOVEL, INFORMATION PROCESSING DEVICE, INFORMATION PROCESSING METHOD, AND NON-TRANSITORY STORAGE MEDIUM

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/011821, filed on Mar. 20, 2019 and designating the U.S., which claims priority to Japanese patent application No. 2018-053222, filed on Mar. 20, 2018. The entire contents of the foregoing applications are incorporated herein by reference.

BACKGROUND

Technical Field

The present invention relates to a shovel, etc.

Description of Related Art

A stabilization control technique has been known in which a hydraulic actuator for driving an attachment is controlled to stabilize a shovel regardless of an operation by an operator, in order to suppress an unstable state, such as slippage and floating of a traveling body that may occur in the shovel.

SUMMARY

According to an aspect of the present invention, there is provided a shovel including a lower traveling body; an upper turning body pivotably attached to the lower traveling body; an attachment attached to the upper turning body; and a processor that stores in a memory, or transmits to an external device, log information including information on the shovel and information on a peripheral environment of the shovel upon detecting that a degree of stability on a motion of the shovel becomes less than a predetermined reference level, or upon detecting an indication indicating that the degree of stability on the motion of the shovel becomes lower than the predetermined reference level.

Furthermore, according to another aspect of the present invention, there is provided an information processing device including a processor that retrieves, from a shovel, log information including information on a state of the shovel and information on a peripheral environment of the shovel each time a degree of stability on a motion of the shovel becomes lower than a predetermined reference level, or each time an indication is detected that indicates that the degree of stability on the motion of the shovel becomes lower than the predetermined reference level; and a memory that stores the log information retrieved by the processor.

Furthermore, according to a further aspect of the present invention, there is provided an information processing method executed by an information processing device capable of communicating with a shovel, the information processing method including: retrieving, from the shovel, information on a state of the shovel and information on a peripheral environment of the shovel upon detecting that a degree of stability on a motion of the shovel becomes lower than a predetermined reference level, or upon detecting an indication indicating that the degree of stability on the motion of the shovel becomes lower than the predetermined reference level; and storing the information retrieved by the retrieving in a memory.

Furthermore, according to a further aspect of the present invention, there is provided a non-transitory storage medium storing a program that causes an information processing device capable of communicating with a shovel to execute: retrieving, from the shovel, information on a state of the shovel and information on a peripheral environment of the shovel upon detecting that a degree of stability on a motion of the shovel becomes lower than a predetermined reference level, or upon detecting an indication indicating that the degree of stability on the motion of the shovel becomes lower than the predetermined reference level; and storing the information retrieved by the retrieving in a memory.

BRIEF DESCRIPTION OF THE DRAWINGS

FIG. 3 is a diagram illustrating an example of a type of information recorded as unstable state log information upon occurrence of an unstable state of a shovel.

FIG. 4A is a diagram illustrating an example of a record of unstable state log information (unstable state log record information) recorded (accumulated) in a management device.

FIG. 4B is a diagram illustrating an example of a record of unstable state log information (unstable state log record information) recorded (accumulated) in a management device.

FIG. 4C is a diagram illustrating an example of a record of unstable state log information (unstable state log record information) recorded (accumulated) in a management device.

FIG. 10 is a diagram illustrating an oscillation motion of a shovel.

FIG. 11 is a diagram illustrating a first example of unstable state log related information (an example of unstable state log record extraction information) displayed on a display device of a support device.

FIG. 14 is a diagram illustrating a fourth example of unstable state log related information (a third example of unstable state log statistical information) displayed on a display device of a support device.

FIG. 15 is a diagram illustrating a fifth example of unstable state log related information (a fourth example of unstable state log statistical information) displayed on a display device of a support device.

FIG. 16 is a diagram illustrating a sixth example of unstable state log related information (a fifth example of unstable state log statistical information) displayed on a display device of a support device.

DETAILED DESCRIPTION

Figure 1:
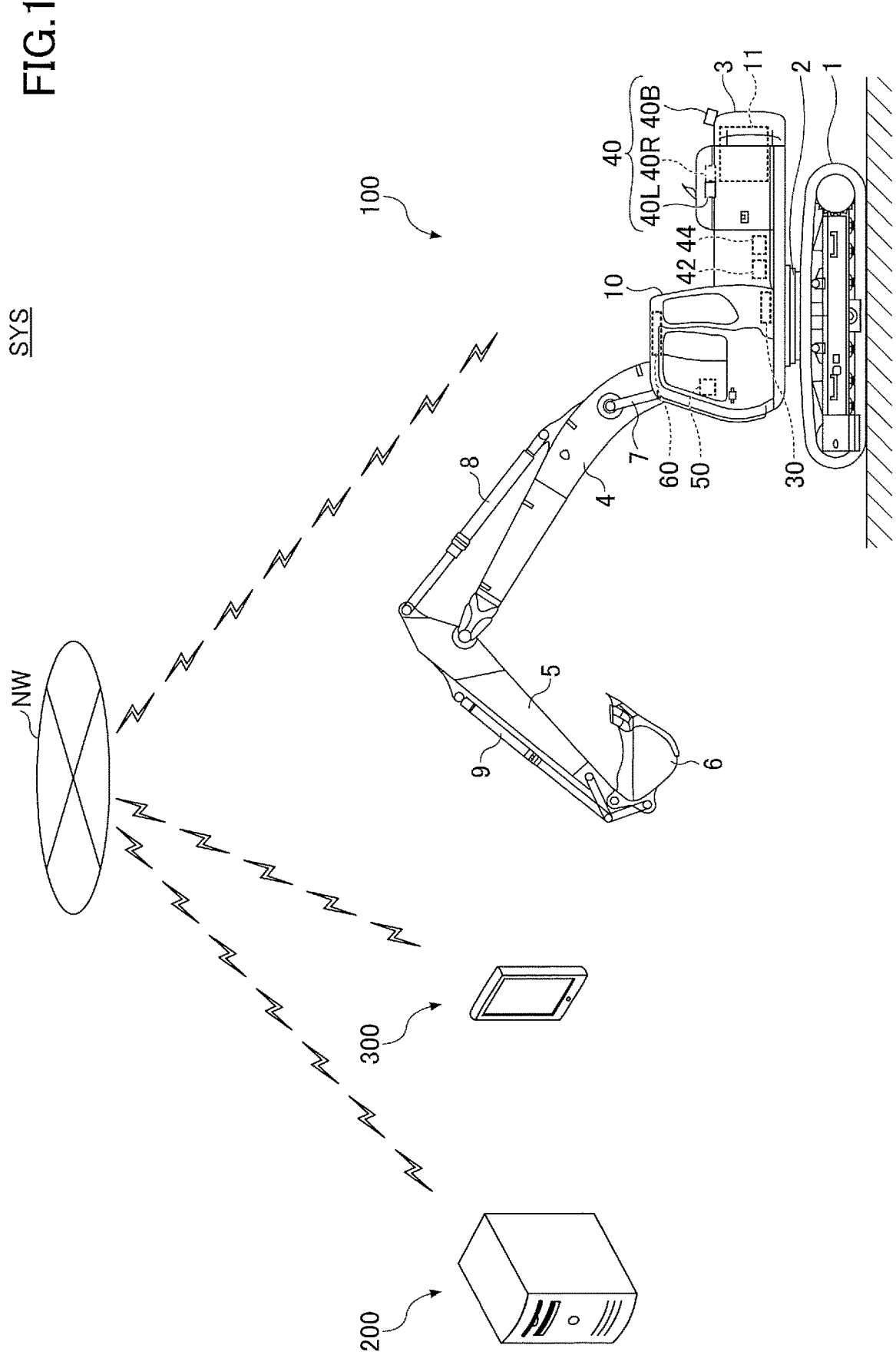
FIG. 1 is a schematic diagram illustrating an example of a configuration of a shovel state log management system according to an embodiment.

In order to suppress an occurrence of an unstable state of a shovel as much as possible, however, it is desirable for an operator to attempt to perform an operation to avoid an unstable state, while assessing a situation in which an unstable state may occur in the shovel.

There is a need for a shovel, etc., capable of accumulating information for an operator, etc., to determine a situation in which an unstable state of a shovel may occur.

According to the above-described embodiments, a shovel, etc., can be provided that can accumulate information for determining, by an operator, etc., a situation in which an unstable state of the shovel may occur.

In the following, embodiments for carrying out the invention are described by referring to the drawings.

[Outline of a Shovel State Log Management System]

First, an outline of a shovel state log management system SYS is described by referring to FIG. 1.

FIG. 1 is a schematic diagram illustrating an example of a configuration of a shovel state log management system SYS according to an embodiment.

The shovel state log management system SYS includes a shovel 100; a management device 200; and a support device 300 to obtain and record log information related to various states of the shovel 100. The shovel state log management system SYS generates information for analyzing various states of the shovel 100 (which is referred to as "log related information," hereinafter) based on log information accumulated through the support device 300 (which is referred to as "log record information," hereinafter) and provides the information to a user.

For example, the shovel state log management system SYS retrieves and records log information (which is referred to as "unstable state log information," hereinafter) including information on the shovel 100 (which is referred to as "shovel related information," hereinafter) and information on a surrounding environment of the shovel 100 (which is referred to as "surrounding environment information," hereinafter) upon detecting an occurrence of an unstable state of the shovel 100, or upon detecting an indication indicating an occurrence of an unstable state (which is referred to as "unstable state indication," hereinafter). The shovel state log management system SYS generates log related information (which is referred to as "unstable state log related information," hereinafter) for analyzing an unstable state of the shovel 100 based on a record of accumulated unstable state log information (which is referred to as "unstable state log record information," hereinafter) and provides the information to a user through the support device 300.

An unstable state of the shovel 100 may include an unstable state caused by a posture state of the shovel 100, i.e., a static unstable state of the shovel 100 (for convenience, which is referred to as "static unstable state," hereinafter). Furthermore, an unstable state of the shovel 100 may include an unstable state caused by a motion of the shovel 100, i.e., a dynamic unstable state of the shovel 100 (for convenience, which is referred to as "dynamic unstable state," hereinafter). Furthermore, an unstable state of the shovel 100 may include an unstable state caused by a geographical feature of a location at which the shovel 100 is located (for convenience, which is referred to as "topographical unstable state," hereinafter).

One shovel 100 or a plurality of shovels 100 may be included in the shovel state log management system SYS. Namely, the shovel state log management system SYS is capable of accumulating log information on a plurality of shovels 100, as targets. In the following, a case is mainly described in which the shovel log management system SYS includes a plurality of shovels 100. Furthermore, one support device 300 or a plurality of support devices 300 may be included in the shovel state log management system SYS. Namely, a plurality of user can receive log related information through respective support devices owned by the users.

<Outline of a Shovel>

The shovel 100 includes a lower traveling body 1; an upper turning body 3 pivotably (turnably) attached to the lower traveling body through a turning mechanism 2; a boom 4, an arm 5, and a bucket 6, as attachments; a cabin 10, etc.

The lower traveling body 1 includes, for example, a pair of crawlers on the left and right, and crawlers are hydraulically driven by respective traveling hydraulic motors 1A and 1B (see FIG. 2) to drive the shovel 100.

The upper turning body 3 is driven by a turning hydraulic motor 2A (see FIG. 2) to rotate relative to the lower traveling body 1.

The boom 4 is pivotably attached to a front center of the upper turning body 3 so that the boom 4 can be raised and lowered, the arm 5 is pivotably attached to a distal end of the boom 4 so that the arm 5 can be turned upward and downward, and the bucket 6 is pivotably attached to a distal end of the arm 5 so that the bucket 6 can be turned upward and downward.

The bucket 6 (an example of an end attachment) is attached to the distal end of the arm 5 so that the bucket 5 can be replaced according to an operation of the shovel. Accordingly, the bucket 6 may be replaced with a different type of bucket, such as a large bucket, a slope bucket, and a dredger bucket. The bucket 6 may also be replaced by a different type of end attachment, such as an agitator, and a breaker.

The boom 4, the arm 5, and the bucket 6 are hydraulically driven by a boom cylinder 7, an arm cylinder 8, and a bucket cylinder 9, respectively, as hydraulic actuators.

The cabin 10 is a cockpit for an operator to board, and, for example, the cabin 10 is provided at a front left side of the upper turning body 3.

The shovel 100 may mutually communicate with the management device 200 through a predetermined communication network NW including, for example, a mobile communication network, the Internet, etc., having a base station, as a termination. Accordingly, the shovel 100 can transmit (upload) various types of information to the management device 200. Details are described below.

<Outline of the Management Device>

The management device 200 (an example of an information processing device) is located at a position geographically separated from the shovel 100 and a user, etc., holding the support device 300. The management device 200 is, for example, a server device that is installed in a management center, etc., provided outside a work site at which the shovel 100 works, and the management device 200 is mainly formed of one or more server computers, etc. In this case, the server device may be a company's own server operated by a business operator operating the shovel state log management system SYS or an affiliated business operator related to the business operator, or the server device may be a cloud server. The management device 200 may also be a stationary or portable computer terminal placed at a management office, etc., within a work site of the shovel 100.

As described above, the management device 200 can mutually communicate with each of the shovel 100 and the support device 300 through the communication network NW. Accordingly, the management device 200 can receive and store (accumulate) various types of information uploaded from the shovel 100. Furthermore, the management device 200 can transmit various types of information including log related information to the support device 300 in response to a request from the support device 300.

<Outline of the Support Device>

The support device 300 is a user terminal used by a user receiving log related information (e.g., a supervisor of a work site, an administrator, an operator of the shovel 100, an administrator of the shovel 100, a service man of the shovel 100, a developer of the shovel 100, etc.). The support device 300 is a general purpose portable terminal, such as a laptop computer terminal, a tablet terminal, and a smartphone held by a user. The assistive device may also be a stationary general purpose terminal, such as a desktop computer. The support device 300 may be a dedicated terminal (a portable terminal or a stationary terminal) for receiving the log management information.

The support device 300 is capable of mutually communicating with the management device 200 through the communication network NW. Accordingly, the support device 300 can receive log-related information transmitted from the management device 200 and provide the log related information to a user through the display device 340 described below, which is installed in the support device 300. Details are described below.

[Configuration of Shovel State Log Management System]

Next, a specific configuration of the shovel state log management system SYS according to an embodiment is described with reference to FIG. 2 in addition to FIG. 1.

Figure 2:
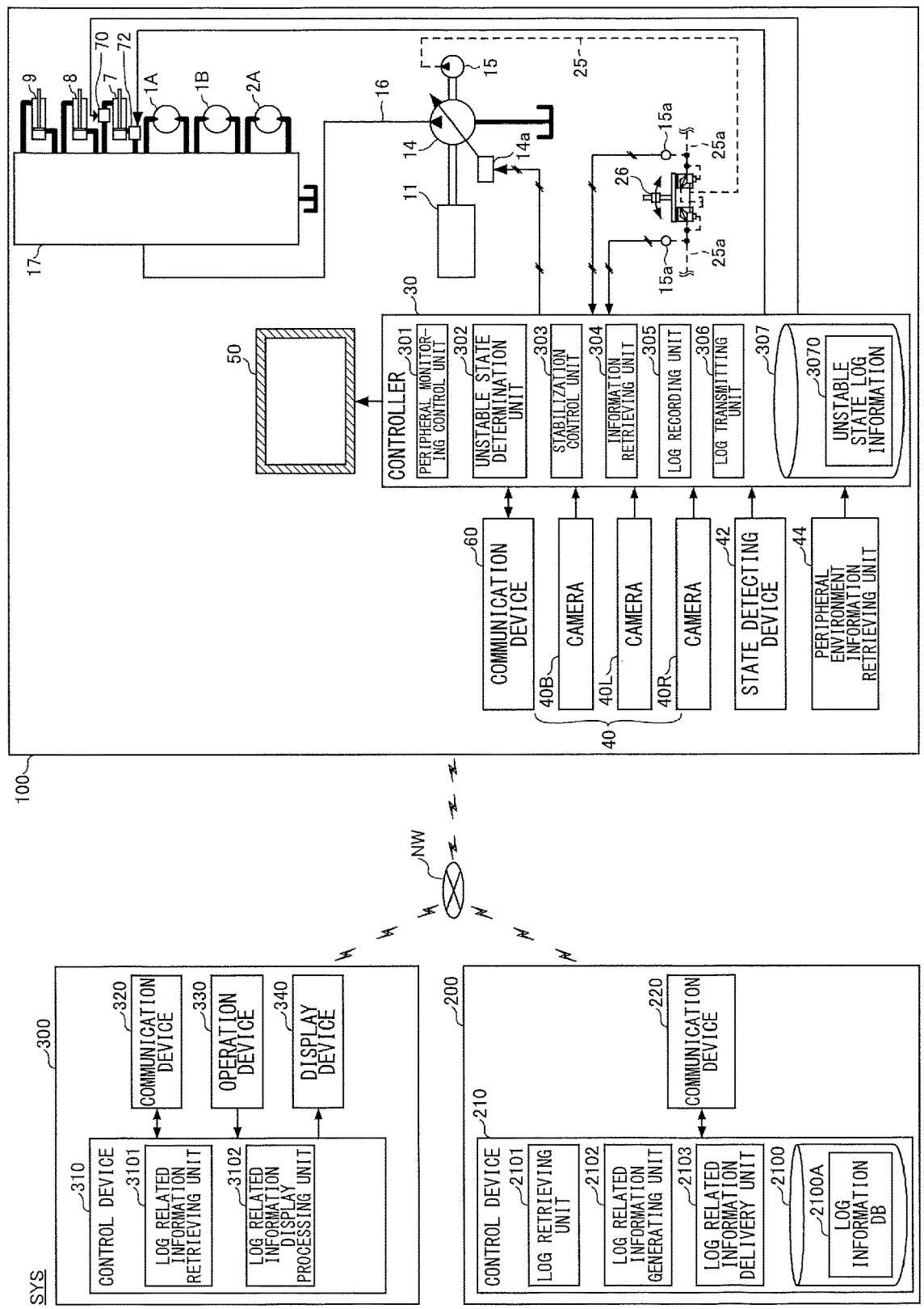
FIG. 2 is a configuration diagram illustrating an example of a configuration of a shovel state log management system according to an embodiment.

FIG. 2 is a configuration diagram illustrating an example of a configuration of the shovel state log management system SYS according to an embodiment.

Note that, in the figure, a mechanical power system is indicated by a double line, a high-pressure hydraulic line is indicated by a thick solid line, a pilot line is indicated by a broken line, and an electric device/control system is indicated by a thin solid line.

<Configuration of the Shovel>

A hydraulic drive system of the shovel 100 according to an embodiment includes an engine 11; a main pump 14; and a control valve 17. As described above, the hydraulic drive system according to the embodiment includes the traveling hydraulic motors 1A and 1B, the turning hydraulic motor 2A, the boom cylinder 7, the arm cylinder 8, and the bucket cylinder 9 for hydraulically driving the lower traveling body 1, the upper turning body 3, the boom 4, the arm 5, and the bucket 6, respectively. In the following, some or all of the traveling hydraulic motors 1A and 1B, the turning hydraulic motor 2A, the boom cylinder 7, the arm cylinder 8, and the bucket cylinder 9 may be referred to as "hydraulic actuator" for convenience.

The engine 11 is a driving source for the shovel 100 and the engine 11 is installed, for example, in a rear part of the upper turning body 3. The engine 11 is, for example, a diesel engine using light oil as fuel. The main pump 14 and a pilot pump 15 are connected to an output shaft of the engine 11.

The main pump 14 is installed, for example, in the rear part of the upper turning body 3 to supply hydraulic oil to the control valve 17 through a high pressure hydraulic line 16. As described above, the main pump 14 is driven by the engine 11. The main pump 14 is, for example, a variable capacity hydraulic pump, and an angle (tilt angle) of a swash plate is controlled by a regulator 14a under the control of a controller 30, so that a stroke length of a piston can be adjusted and a discharge flow rate (discharge pressure) can be adjusted (controlled).

The control valve 17, for example, is installed in a center part of the upper turning body 3, and the control valve 17 is a hydraulic control device that controls the hydraulic drive system according to an operation of an operation device 26 by an operator. Specifically, the control valve 17 controls the supply and discharge of hydraulic oil to respective hydraulic actuators in response to an operation input to the operation device 26. The traveling hydraulic motor 1A (for right) and 1B (for left), the turning hydraulic motor 2A, the boom cylinder 7, the arm cylinder 8, the bucket cylinder 9, etc., are connected to the control valve 17 via the high pressure hydraulic line. The control valve 17 is provided between the main pump 14 and the respective hydraulic actuators, and the control valve 17 is a valve unit which includes a plurality of hydraulic control valves, i.e., directional switching valves for controlling the flow rate and flow direction of hydraulic oil supplied from the main pump 14 to the respective hydraulic actuators.

An operating system of the shovel 100 according to an embodiment includes a pilot pump 15; the operation device 26; and a pressure sensor 15*a*.

The pilot pump 15, for example, is installed in the rear part of the upper turning body 3, and the pilot pump 15 supplies pilot pressure to the operation device 26 via a pilot line 25. The pilot pump 15 is, for example, a fixed capacitive hydraulic pump driven by the engine 11 as described above.

The operation device 26 is provided in a vicinity of the cockpit of the cabin 10, and the operation device 26 is an operation means by which an operator operates each of the operating elements (the lower running body 1, the upper turning body 3, the boom 4, the arm 5, the bucket 6, etc.). In other words, the operation device 26 is an operating means for operating the respective hydraulic actuators (such as the traveling hydraulic motors 1A and 1B, the turning hydraulic motor 2A, the boom cylinder 7, the arm cylinder 8, and the bucket cylinder 9) for driving the respective operating elements. The operation device 26 includes, for example, a lever, a pedal, etc. The operation device 26 is based on a hydraulic pilot, and the operating device 26 is connected to control valve 17 via a hydraulic line 25*a*. Accordingly, the control valve 17 receives a pilot signal (pilot pressure) according to an operating state (for example, details of an operation, such as an operation amount, an operation direction, etc.) of the lower traveling body 1, the upper turning body 3, the boom 4, the arm 5, and the bucket 6 in the operation device 26. Accordingly, the control valve 17 can drive the respective hydraulic actuators according to an operating condition of the operation device 26.

The operation device 26 may be an electric device. In this case, the operation device 26 outputs an electric signal ("operation signal," hereinafter) according to an operation state (the details of the operation) and the operation signal is input into the controller 30. The controller 30 outputs a control command corresponding to the operation signal to a proportional valve that can cause pilot pressure to act on the control valve 17 using hydraulic oil supplied from the pilot pump 15. Accordingly, the pilot pressure in accordance with the details of the operation on the operation device 26 acts on the control valve 17 from the proportional valve. As a result, the controller 30 can achieve a motion of the hydraulic actuator according to the details of an operation on the operation device 26.

The pressure sensor 15*a* detects secondary pilot pressure at the operation device 26, i.e., the pilot pressure corresponding to the operating state of each operating element in the operation device 26. The pressure sensor 15*a* is connected to the controller 30, and a pressure signal in the operation device 26 (pressure detection value) corresponding to operation states of the lower traveling body 1, the upper turning body 3, the boom 4, the atm 5, the bucket 6, etc., is input into the controller 30. As a result, the controller 30 can detect operating conditions of the lower traveling body 1, the upper turning body 3, and the attachments (the boom 4, the arm 5, and the bucket 6) of the shovel 100.

The control system of the shovel 100 according to an embodiment includes the controller 30; an imaging device 40; a state detecting device 42; a peripheral environmental information retrieving device 44; a display device 50; a communication device 60; and electromagnetic relief valves 70 and 72.

The controller 30 performs drive control of the shovel 100. The function of the controller 30 may be implemented by any hardware, software, or a combination thereof. The controller 30 is mainly formed of a microcomputer including, for example, a CPU (Central Processing Unit), a RAM (Random Access Memory), a ROM (Read Only Memory), a non-volatile auxiliary storage device, an input/output interface, etc. The controller 30 implements various functions, for example, by executing one or more programs stored in a ROM or an auxiliary storage device on the CPU. The same applies to the controller 210 of the management device 200 and the controller 310 of the support device 300, which are described below.

For example, the controller 30 monitors intrusion of a predetermined monitoring target into a range relatively close to the shovel 100 (which is referred to as the "monitored area," hereinafter) based on a captured image in the vicinity of the shovel 100 captured by the imaging device 40. For example, the monitoring target may include, not only persons, such as a worker or a supervisor of a work site, but also any object, e.g., a moving object (mobile object) such as a work vehicle, and a stationary object, such as a stationary material, or a topographical obstacle, e.g., a rock.

For example, the controller 30 stores, in an internal memory (which is a storage unit 307 described below), unstable state log information including shovel related information, surrounding environment information, etc., when a state occurs in which stability of the shovel 100 is lower than a predetermined reference level, i.e., when the above-described unstable state occurs. The stability of the shovel 100 may include a static stability (which is referred to as "static stability," hereinafter) corresponding to the static unstable state of the shovel 100 described above. Furthermore, the stability of the shovel 100 may include dynamic stability (which is referred to as "dynamic stability," hereinafter) corresponding to the dynamic unstable state of the shovel 100 described above. The stability of the shovel 100 may also include a topographical stability (which is referred to as "topographical stability," hereinafter) corresponding to the topographical instability of the shovel 100 described above.

The controller 30 may store, in the internal memory, the unstable state log information including shovel related information, surrounding environment information, etc., when an indication occurs that indicates that stability of the shovel 100 lowers a predetermined reference level, i.e., when an indication occurs that indicates that an unstable state of the shovel 100 occurs.

A static unstable state of the shovel 100 includes, for example, a posture state such that a distal end of the attachments, i.e., a position of the bucket 6 is relatively separated from the vehicle body (the lower traveling body 1, the turning mechanism 2, the upper turning body 3, etc.) of the shovel 100 (which is referred to as "first unstable posture state," hereinafter). As the position of the bucket 6 is relatively largely separated from the vehicle body, a moment that acts from the attachment to the vehicle body in a direction in which the shovel 100 overturns in the forward direction (which is referred to as "overturning moment," hereinafter) becomes relatively large, and the shovel 100 relatively easily overturns. The static instability state of the shovel 100 also includes, for example, a posture state such that the distal end of the attachments, i.e., the position of the bucket 6 is located at a relatively high position (which is referred to as "second unstable posture state," hereinafter).

For example, when the shovel 100 starts overturning in the forward direction due to some reason, such as a motion of the shovel 100 or an action, etc., of external force, etc., if the position of the bucket 6 is located at a relatively high position, it is difficult to suppress overturning of the shovel 100 by causing the bucket 6 to contact the ground. Furthermore, a static unstable state of the shovel 100 includes, for example, a posture state such that a relative angle (turning angle) between a traveling direction of the lower traveling body 1 and an orientation of the upper turning body 3, i.e., an orientation of the attachments is relatively large (which is referred to as "third unstable posture state," hereinafter). For example, the lower traveling body 1 has a relatively smaller grounding length in the width direction than the traveling direction, and when the direction of the attachment is relatively close to the width direction of the lower traveling body 1, the shovel 100 easily overturns due to weight of the attachments or a motion of the attachments.

A dynamic unstable state of the shovel 100 includes, for example, a state in which the shovel 100 (the lower traveling body 1) slides forward or backward and a state in which it is highly likely that the shovel 100 slides forward or backward due to reaction force, etc., applied to the attachments from the ground during excavation or leveling operations (which is referred to as "forward sliding unstable state" or "backward sliding unstable state"). In the following, the forward sliding unstable state and the backward sliding unstable state may be collectively referred to as "sliding unstable state." Furthermore, a dynamic unstable state of the shovel 100 includes, for example, a state in which it is highly likely that the front part or the rear part of the shovel 100 (the lower traveling body 1) is floated (for convenience, which is referred to as "front part floating unstable state" or "rear part floating unstable state," hereinafter) due to drilling reaction force, etc. Here, the front part floating unstable state may include a jack-up state in which the front part of the lower traveling body 1 is floated due to a downward motion of the boom 4 or a closing motion of the arm 5 in a state in which the bucket 6 contacts the ground. In the following, the front part floating unstable state and the rear part floating unstable state may correctively be referred to as "floating unstable state." Furthermore, a dynamic unstable state of the shovel 100 includes, for example, a state in which it is highly likely that an oscillation occurs in the vehicle body (the lower traveling body 1, the turning mechanism 2, and the upper turning body 3) due to a change, etc., in an inertial moment of the attachment during an aerial motion of the attachment (a motion in a state in which the bucket 6 does not contact the ground) of the shovel 100 (for convenience, which is referred to "oscillation unstable state," hereinafter). Furthermore, a dynamic unstable state of the shovel 100 may include, not only a case in which sliding, floating, or oscillation of the shovel 100 actually occurs, but also a case in which sliding, floating, or oscillation of the shovel 100 can occur, but an occurrence of the sliding, the floating, or the oscillation of the shovel 100 is avoided by the stabilization control, which is described below. Details of the dynamic unstable state of the shovel 100 is described below (see FIG. 3-FIG. 8).

A topographical unstable state of the shovel 100 may include, for example, a state in which the lower traveling body 1 slides forward or backward or a state in which it is highly likely that the lower traveling body 1 slides forward or backward due to a topographic effect (which is referred to as "topographical sliding unstable state," hereinafter) during traveling of the lower traveling body 1 or working with the upper turning body 3 and the attachments. Furthermore, a topographical unstable state of the shovel 100 may include, for example, a state in which a part of the lower traveling body 1 floats or a state in which it is highly likely that a part of the lower traveling body 1 floats due to a topographic effect (which is referred to as "topographical floating unstable state," hereinafter) during traveling of the lower traveling body 1 or working with the upper turning body 3 and the attachments. Furthermore, a topographical unstable state of the shovel 100 may include, for example, a state in which the vehicle body tilts or fluctuates or a state in which it is highly likely that the vehicle body tilts or fluctuates due to a topographic effect (which is referred to as "topographic tilt unstable state," hereinafter) during traveling of the lower traveling body 1 or working of the shovel 100 using the upper turning body 3 and the attachments. Furthermore, a topographic unstable state of the shovel 100 may include, for example, a state in which the vehicle body oscillates or a state in which it is highly likely that the vehicle body oscillates due to a topographic effect (which is referred to as "topographic oscillation unstable state," hereinafter) during traveling of the lower traveling body 1 or working of the shovel 100 using the upper turning body 3 and the attachments. A topographic effect may include land quality, moisture on the ground, slope of the ground, unevenness of the ground, collapse of the ground, etc.

The controller 30 includes a peripheral monitoring control unit 301; an unstable state determination unit 302; a stabilization control unit 303; an information retrieving unit 304; a log recording unit 305; and a log transmitting unit 306, as functional units implemented by executing one or more programs stored in an ROM or an auxiliary storage device on the CPU, for example. Furthermore, the controller 30 includes a storage unit 307, as a storage area defined in an internal memory of an auxiliary storage device etc.

Note that some of the functions of the controller 30 may be implemented by another controller. Namely, the functions of the controller 30 may be implemented by a plurality of controllers in a distributed manner. Furthermore, a storage area corresponding to the storage unit 307 may be provided outside the controller 30 and defined in an external storage device that is connected to the controller 30 so as to enable communication.

The imaging device 40 is attached to the upper portion of the upper turning body 3 and captures the periphery of the shovel 100 to output an image. A captured image that is to be output may include an image of an object that includes a monitoring target located in the vicinity of the shovel 100. Namely, the imaging device 40 outputs a captured image as detected information on an object located in the vicinity of the shovel 100. The imaging device 40 includes cameras 40B, 40L, and 40R.

The camera 40B, the camera 40L, and the camera 40R are installed in the upper rear end part of the upper turning body 3, the upper left end part of the upper turning body 3, and the upper right end part of the upper turning body 3, respectively, to capture images at the rear side, the left side, and the right side of the upper turning body 3. For example, the camera 40B, the camera 40L, and the camera 40R are single-eye wide angle cameras each having a very wide field angle. Specifically, the camera 40B, the camera 40L, and the camera 40R are respectively installed so that the optical axis is obliquely downward in the upper part of the upper turning body 3, and the camera 40B, the camera 40L, and the camera 40R capture a vertical imaging range including a range from the ground in the vicinity of the shovel 100 to a distant place from the shovel 100. Each of the camera 40B, the camera 40L, and the camera 40R outputs a captured image every predetermined period (e.g., 1/30 seconds) during an operation of the shovel 100, and the captured image that is output is input into the controller 30.

The state detecting device 42 obtains detected information on various types of states of the shovel 100. The state detecting device 42 may obtain detected information for specifying an operator operating the shovel 100 and detected information on various states of the operator. The detected information on various types of states of the shovel 100 obtained by the state detecting device 42 is input into the controller 30.

For example, the state detecting device 42 obtains detected information on a posture state of the attachment of the shovel 100. Specifically, the state detecting device 42 may output detected information on a relative elevation angle of the boom 4 relative to the upper turning body 3 (hereinafter, "boom angle"), a relative elevation angle of the arm 5 relative to the boom 4 (hereinafter, "arm angle"), and a relative elevation angle of the bucket 6 relative to the arm 5 (hereinafter, "bucket angle"). In this case, the state detecting device 42 includes, for example, a rotary encoder provided in a joint of an attachment, an acceleration sensor, an angular velocity sensor, a 6-axis sensor, an IMU (Inertial Measurement Unit) attached to an attachment, etc.

For example, the state detecting device 42 obtains detected information on a motion state of an attachment of the shovel 100. Specifically, the state detecting device 42 may output detected information on acceleration or angular acceleration of at least one of the boom 4, the arm 5, and the bucket 6. In this case, the state detecting device 42 includes, for example, an acceleration sensor, an angular velocity sensor, a 6-axis sensor, an IMU, etc., attached to an attachment.

For example, the state detecting device 42 outputs detected information on a driving state of an attachment of the shovel 100. Specifically, the state detecting device 42 may output detected information on driving force (thrust) of a hydraulic actuator (the boom cylinder 7, the arm cylinder 8, and the bucket cylinder 9) driving the boom 4, the arm 5, and the bucket 6. In this case, the state detecting device 42 includes, for example, a cylinder pressure sensor for detecting cylinder pressure of at least one of the boom cylinder 7, the arm cylinder 8, and the bucket cylinder 9 (specifically, oil pressure of a rod side oil chamber and a bottom side oil chamber).

For example, the state detecting device 42 obtains detected information on a motion state of a body (such as the lower traveling body 1, the turning mechanism 2, and the upper turning body 3). Specifically, the state detecting device 42 may output detected information on speed, acceleration, angular velocity, etc. of the lower traveling body 1 or the upper turning body 3. In this case, the state detecting device 42 includes, for example, a turning angle sensor attached to a swivel joint of the upper turning body 3, an acceleration sensor, an angular velocity sensor, a 6-axis sensor, an IMU, etc., attached to the lower traveling body 1 or the upper turning body 3.

For example, the state detecting device 42 outputs detected information on a load state of the attachment (bucket 6). Specifically, the state detecting device 42 may output detected information on a load acting on the bucket 6. The state detecting device 42 includes, for example, a load sensor, etc., attached to the bucket 6.

For example, the state detecting device 42 obtains information on a tilting state of the vehicle body (the upper traveling body 3). Specifically, the state detecting device 42 may output detected information on two axes, i.e., a tilt angle in the front-rear direction and a tilt angle in the left-right direction of the upper turning body 3. The state detecting device 42 includes, for example, a tilt sensor, an acceleration sensor, a 6-axis sensor, an IMU, etc., mounted to the upper turning body 3.

For example, the state detecting device 42 outputs detected information on a direction of the lower traveling body 1 (the crawler) relative to the upper turning body 3 (hereinafter, referred to as "crawler direction"). Specifically, the state detecting device 42 may output detected information on a rotation angle of the upper turning body 3. The state detecting device 42 includes, for example, a turning angle sensor attached to a swivel joint of the upper turning body 3, an acceleration sensor, an angular velocity sensor, a 6-axis sensor, an IMU, etc., attached to any position of the upper turning body 3.

For example, the state detecting device 42 outputs detected information on reaction force applied (input) from an attachment to the vehicle body (the upper turning body 3). Specifically, the state detecting device 42 may output detected information on reaction force input to the vehicle body through the boom cylinder 7. The state detecting device 42 includes, for example, a cylinder pressure sensor for detecting oil pressure in a bottom side oil chamber and a rod side oil chamber of the boom cylinder 7, a load sensor for detecting a load acting on a connecting portion of the upper turning body 3 with the boom 4, etc.

For example, the state detecting device 42 outputs detected information on a working state of the shovel 100. Specifically, the state detecting device 42 outputs detected information on a type of work performed by the shovel 100. The types of work may include excavation work, loading work for loading earth and sand into a truck, leveling work, rolling work, work related to aerial motion (aerial work), etc. The state detecting device 42 includes cylinder pressure sensors, etc., for detecting pressure inside cylinders (the rod side oil chambers and the bottom side oil chambers) of the boom cylinder 7, the arm cylinder 8, and the bucket cylinder 9. Accordingly, the controller 30 can determine (estimate) a type of work performed by the shovel 100 based on transition of cylinder pressure of the boom cylinder 7, the arm cylinder 8, and the bucket cylinder 9, operation conditions of the boom 4, the arm 5, and the bucket 6 by the operation device 26, etc. The state detecting device 42 may also include a sensor capable of detecting a motion of an attachment, such as a camera, millimeter wave radar, and LIDAR. Accordingly, the controller 30 can determine (estimate) a type of work performed by the shovel 100 by detecting a motion state of an attachment based on output information of these sensors.

For example, the state detecting device 42 outputs detected information on an operation state (a rotation state) of the engine 11. The state detecting device 42 includes, for example, an engine revolution speed sensor, etc., for detecting a number of revolution (revolution per minute) of the engine 11.

For example, the state detecting device 42 retrieves detected information for identifying an operator during operation. Specifically, the state detecting device 42 may retrieve image information including an image of an operator during operation. In this case, the state detecting device 42 includes a camera, etc., installed in the cabin 10 that is capable of capturing an image of an upper body of an operator including a face. The state detecting device 42 may retrieve physical feature information (fingerprint information, iris information, etc.) of an operator during operation. In this case, the state detecting device 42 includes a fingerprint sensor provided on a lever or the like included in the operating device 26, an iris sensor provided at a position facing an operator's face portion within the cabin 10, etc.

An operator during operation may be identified by the controller 30 in accordance with a predetermined operation by the operator. In this case, through a predetermined operation by an operator, the controller 30 may identify the operator during operation by selecting a particular operator from a pre-registered operator list on an operator selection screen displayed on the display device 50 at the time of starting the shovel 100.

For example, the state detecting device 42 retrieves detected information on an operator's state during operation. Specifically, the state detecting device 42 may retrieve operator's biological information (e.g., an electrocardiogram, an electroencephalogram, etc.). In this case, the state detecting device 42 includes an electroencephalograph embedded in a helmet wore by an operator and capable of wirelessly communicating with the controller 30, an electrocardiograph embedded in a wearable device worn by an operator at an arm, etc., and capable of wirelessly communicating with the controller 30, and the like.

A peripheral environment information retrieving device 44 retrieves surrounding environment information of the shovel 100. The surrounding environment information of the shovel 100 retrieved by the peripheral environment information retrieving device 44 is input into the controller 30.

For example, the peripheral environment information retrieving device 44 includes an RTC (Real Time Clock), etc., and retrieves date and time information including date, day of the week, and time.

The date and time information may be obtained by a time counting means (e.g., RTC) within the controller 30.

For example, the peripheral environment information retrieving device 44 retrieves weather information of a location at which the shovel 100 is working. Specifically, the peripheral environment information retrieving device 44 may be connected to the communication network NW through the communication device 60 and may retrieve weather information from a server or a website for predetermined weather information. Furthermore, the peripheral environment information retrieving device 44 includes an illumination intensity sensor, a rain drop detection sensor, or the like, and may obtain weather information based on illumination intensity, presence or absence of rain, etc., output by the illumination intensity sensor and the rain drop detection sensor.

For example, the peripheral environment information retrieving device 44 retrieves geographical location information of the shovel 100. Specifically, the peripheral environment information retrieving device 44 includes, for example, a GNSS (Global Navigation Satellite System) device and may obtain position information of the shovel 100 based on signals, etc., from three or more satellites in the air above the shovel 100.

For example, the peripheral environment information retrieving device 44 retrieves detailed information (hereinafter, "peripheral state detailed information") on a peripheral state of the shovel 100. Specifically, the peripheral environment information retrieving device 44 may retrieve a captured image (image information) representing a situation in the vicinity of the shovel 100 from a camera installed in the shovel 100, which includes the imaging device 40, etc. The peripheral environmental information retrieving device 44 may retrieve information on three-dimensional topography in the vicinity of the shovel 100 (hereinafter, "topographic information"). In this case, the peripheral environment information retrieving device 44 includes a distance sensor, such as a camera, a millimeter-wave radar, or a LIDAR, and obtains the topographic information in the vicinity of the shovel 100 based on an output image of the distance sensor. In this case, the peripheral environment information retrieving device 44, for example, connects to the communication network NW through the communication device 60 and retrieves the topographic information of the work site from a management server related to the information conversion construction at the work site of the shovel 100. The peripheral environment information retrieving device 44 may retrieve information on peripheral monitoring control (hereinafter, "peripheral monitoring control information") described below. In this case, the peripheral environment information retrieving device 44 retrieves detected information on an operating state of the peripheral monitoring control (including presence or absence of a peripheral monitoring control function or an ON/OFF state) and a monitoring target.

Some or all of the functions of the peripheral environment information retrieving device 44 may be included in the controller 30.

The display device 50 is provided in the vicinity of the cockpit within the cabin 10, specifically at a position easily visible from an operator seated in the cockpit, and the display device 50 displays, under control of the controller 30, various types of image information to be notified to the operator. The display device 50 is, for example, a liquid crystal display or an organic EL (Electroluminescence) display, and may be a touch panel display which also serves as an operation unit. The display device 50 displays, for example, an image (through image) captured by the imaging device 40 or an image generated by the controller 30 based on an image captured by the imaging device 40 (e.g., a viewpoint-converted image synthesized from images captured by the cameras 40B, 40L, and 40R), etc.

The communication device 60 is any device that communicates with an external device, such as the management device 200, through the communication network NW. The communication device 60 is a mobile communication module conforming to a predetermined mobile communication standard, such as LTE (Long Term Evolution), 4G (4th Generation), and 5G (5th Generation).

The electromagnetic relief valve 70 is provided in the high-pressure hydraulic line between the rod-side oil chamber of the boom cylinder 7 and the control valve 17, the electromagnetic relief valve 72 is provided in the high-pressure hydraulic line between the bottom-side oil chamber of the boom cylinder 7 and the control valve 17, and the electromagnetic relief valves 70 and 72 discharge (relief) hydraulic oil in the rod-side oil chamber and the bottom-side oil chamber of the boom cylinder 7 to a tank. Accordingly, the controller 30 may suppress an excessive increase in oil pressure by inputting control currents to the electromagnetic relief valves 70 and 72 so as to cause hydraulic oil in the rod-side oil chamber or the bottom-side oil chamber of the boom cylinder 7 to be discharged to the tank.

The peripheral monitoring control unit 301 performs, based on an image captured by the imaging device 40, peripheral monitoring control for monitoring intrusion of a monitoring target into a monitored area adjacent to the shovel 100 in the vicinity of the shovel 100.

For example, the peripheral monitoring control unit 301 recognizes a monitoring target within an image captured by the imaging device 40 by applying a machine learning-based classifier including various types of known image processing techniques, artificial intelligence (AI: Artificial Intelligence), etc. Furthermore, the peripheral monitoring control unit 301 can determine (estimate) a location (hereinafter, referred to as "actual position"; for example, a foot position) at which a recognized monitoring target (person) included in an image captured by the monocular imaging device 40 is located by applying various types of known methods. Accordingly, the peripheral monitoring control unit 301 can detect a monitoring target in a monitored area.

For example, in response to detecting a monitoring target, the peripheral monitoring control unit 301 uses an audible method or a visual method to output an alarm to the interior or the exterior of the cabin 10. Furthermore, upon detecting a monitoring target, the peripheral monitoring control unit 301 may restrict motions of various operating elements of the shovel 100 (the lower traveling body 1, the upper turning body 3, the attachments, etc.). In this case, the peripheral monitoring control unit 301 may restrict a motion (suspend operation) of the shovel 100 by controlling a gate lock valve provided in the pilot line 25 between the pilot pump 15 and the operation device 26 so as to cause the pilot line in a non-communication state.

The unstable state determination unit 302 determines whether stability of the shovel 100 is lower than a predetermined reference level based on detected information of the state detecting device 42 or detected information of the pressure sensor 15a. Namely, the unstable state determination unit 302 determines whether the above-described unstable state (i.e., any of a static unstable state, a dynamic unstable state, and a topographic unstable state) occurs in the shovel 100.

The unstable state determination unit 302, for example, detects a posture state of the shovel 100 based on detected information of the state detecting device 42. The unstable state determination unit 302 may determine whether the shovel 100 is in a static unstable state based on whether the detected posture state corresponds to any of the first to third unstable posture states. The unstable state determination unit 302 retrieves, for example, an index value (hereinafter, a "static stability index value") representing current static stability of the shovel 100. The unstable state determination unit 302 may determine that a static unstable state has occurred in the shovel 100 upon detecting that the index value exceeds a predetermined threshold value in a direction in which the shovel 100 becomes statically unstable, i.e., in a direction in which a state of the shovel 100 becomes any of the first to third unstable posture states.

In this case, the static stability index value may be a physical quantity related to a state of the shovel 100 having a relatively high correlation with a dynamic unstable state of the shovel 100 (e.g., a horizontal distance of the bucket relative to the vehicle body in the first unstable state). Furthermore, the static stability index value may be calculated as total stability based on at least one of information on the centroid of the shovel 100, information on a position of the bucket 6 relative to the vehicle body, information on an operating state of the attachment in the operation device 26, crawler direction information, etc.

The unstable state determination unit 302 may determine a dynamic unstable state of the shovel 100 as described below.

The unstable state determination unit 302 may determine that the shovel 100 is in a topographic unstable state, for example, upon detecting, in a state that does not correspond to a static unstable state and a dynamic unstable state, occurrence of sliding of the lower traveling body 1, floating of the lower traveling body 1, tilting of the vehicle body (including fluctuation), oscillation of the vehicle body, etc., in the shovel 100.

Furthermore, the unstable state determination unit 302 determines whether there is an indication indicating that stability of the shovel 100 becomes lower than a predetermined reference level based on detected information of the state detecting device 42 or detected information of the pressure sensor 15a. Namely, the unstable state determination unit 302 determines whether an indication of the above-described unstable state has occurred in the shovel 100.

The unstable state determination unit 302, for example, detects a posture state of the shovel 100 and operation details of the operation device 26 based on detected information of the state detecting device 42 and the pressure sensor 15a. The unstable state determination unit 302 may determine that there is an indication indicating a static unstable state upon detecting that a posture state of the shovel 100 is close to any of the first to third unstable posture states and an operation is performed by the operation device 26 to approach the unstable posture state. The unstable state determination unit 302 may, for example, determine that there is an indication indicating a static unstable state upon detecting that the static stability index value moves from a stable side toward the predetermined threshold value and the static stability index value is relatively close to the predetermined threshold value.

The unstable state determination unit 302 may determine whether there is an indication indicating a dynamic unstable state of the shovel 100 as described below.

The unstable state determination unit 302 detects a peripheral topographical state, for example, based on output information of the imaging device 40 and the peripheral environment information retrieving device 44. The unstable state determination unit 302 may determine whether there is any indication of occurrence of sliding of lower traveling body 1, floating of the lower traveling body 1, tilting of the vehicle body, oscillation of the vehicle body, etc., due to a topographic effect, i.e., whether there is any indication of occurrence of a topographical unstable state by detecting that a peripheral topographical state is changed from a past topographical state.

Details of a method of determining occurrence of a dynamic unstable state of the shovel 100 and an indication of a dynamic unstable state by the unstable state determination unit 302 are described below.

The stabilization control unit 303 performs stabilization control for controlling (correcting) motions of the attachments, so that a motion corresponding to an unstable state of the shovel 100 (which is referred to as "unstable motion," hereinafter), i.e., a sliding motion, a floating motion, an oscillation motion, etc., of the shovel 100 can be suppressed. For example, the stabilization control unit 303 activates the stabilization control upon detecting that the stability of the shovel 100 is relatively lowered, and the stabilization control unit 303 controls the boom cylinder 7, an arm cylinder 8, etc., corresponding to motions of attachments by intervening an operation on the operation device 26 by an operator. Details are described below.

The information retrieving device 304 retrieves predetermined types of shovel related information and peripheral environment information stored in the storage unit 307 as unstable state log information by the log recording unit 305.

For example, the information retrieving unit 304 retrieves, based on various types of information input from the imaging device 40, the state detecting device 42, the peripheral environment information retrieving unit 44, etc., information related to a state of the shovel 100 ("shovel state information," hereinafter), operator related information (operator specific information or operator state information), or peripheral environment information, from the shovel related information items that can be the targets.

For example, upon determining, by the unstable state determination unit 302, that an unstable state of the shovel 100 occurs or there is an indication of occurrence of an unstable state of the shovel 100, the information retrieving unit 304 retrieves information on a determination result, for example, information on a type of an unstable state (a sliding unstable state, a floating unstable state, an oscillation unstable state, etc.).

For example, the information retrieving unit 304 retrieves identification information of the shovel 100, as information specific to the shovel 100 (hereinafter, the "shovel specific information") stored in an internal memory, such as the storage unit 307 of the controller 30, among shovel related information items.

In particular, the information retrieving unit 304 sequentially retrieves dynamic information (information that can change sequentially) among the shovel related information and peripheral environmental information, and stores the information in the internal memory for a certain period of time. Specifically, the information retrieving unit 304 obtains dynamic information input from the imaging device 40, the state detecting device 42, and the peripheral environment information retrieving device 44 and buffers the obtained information into a ring buffer defined in the internal memory. Accordingly, the log recording unit 305 described below can read, not only the information at a time point at which the unstable state of the shovel 100 occurs or at the time point at which an indication of occurrence the unstable state of the shovel 100 occurs, but also the information that has been obtained at a time prior to the time point to a certain extent, from the ring buffer, and record the information in the storage unit 307.

The log recording unit 305 (an example of the information managing unit) records the shovel-related information and the peripheral environment information obtained by the information retrieving unit 304 as the unstable state log information 3070 in the storage unit 307 upon detecting, by the unstable state determination unit 302, that an unstable state of the shovel 100 occurs, or upon detecting, by the unstable state determination unit 302, that there is an indication indicating the occurrence of the unstable state of the shovel 100. Accordingly, the unstable state log information at a time of occurrence of an unstable state of the shovel 100 can be accumulated in the management device 200 as described below. As a result, a user, etc., of the support device 300 can perform various analyses on the unstable state of the shovel 100. Furthermore, not only the unstable state log information at a time of occurrence of an unstable state of the shovel 100, but also the unstable state log information at a time of occurrence of an indication of an unstable state of the shovel 100 may be stored in the management device 200, as described below. Accordingly, a user, etc., of the support device 300 can utilize, for example, the unstable state log information of a situation in which the state of the shovel 100 does not become unstable owing to the stabilization control. Accordingly, a user, etc., of the support device 300 can conduct various types of analyses on an unstable state of the shovel 100 in a more diversified manner. At this time, the log recording unit 305 records, in the storage unit 307, the shovel related information and the peripheral environment information at a time at which it is determined that an unstable state of the shovel 100 has occurred (hereinafter, "unstable state occurrence time") or at a time at which it is determined that there is an indication indicating that an unstable state may occur (hereinafter, "unstable indication occurrence time") by the unstable state determination unit 302. In the following, "unstable state occurrence time" and "unstable indication occurrence time" are collectively referred to as "unstable state/indication occurrence time." In addition, the log recording unit 305 may record, in the storage unit 307, the shovel-related information or the peripheral environment information at a time that is a predetermined time prior to the unstable state/indication occurrence time of the shovel 100 (hereinafter, "before occurrence of an unstable state" or "before occurrence of an unstable state indication"), or at a time that is a predetermined time after the unstable state/indication occurrence time of the shovel 100 (hereinafter, "after occurrence of an unstable state" or "after occurrence of an unstable state indication"). In the following, "before occurrence of an unstable state" and "before occurrence of an unstable state indication" are collectively referred to as "before occurrence of an unstable state/indication," and "after occurrence of an unstable state" and "after occurrence of an unstable state indication" are collectively referred to as "after occurrence of an unstable state/indication." As a result, the user of the support device 300 can conduct a more diversified analysis on the unstable state occurred in the shovel 100 or the unstable state with the indication of occurrence because time-series changes in the dynamic information of the shovel related information or the peripheral environment information upon occurrence of an unstable state of the shovel 100 or upon detecting an indication indicating occurrence of an unstable state can be identified. Furthermore, when the log recording unit 305 records the shovel related information or the peripheral environment information before occurrence of an unstable state/indication or after occurrence of an unstable state/indication of the shovel 100, the log recording unit 305 may limit the type of information to be recorded to dynamic information. As a result, a storage area occupied by the unstable state log information is reduced, and more unstable state log information can be recorded (stored) in the storage unit 307 or the storage unit 2100 of the management device 200, which is described below.

For example, FIG. 3 is a diagram illustrating an example of a type of information that is recorded as unstable state log information by the log recording unit 305 upon occurrence of an unstable state of the shovel 100, or upon detecting an indication of occurrence of an unstable state of the shovel 100.

As illustrated in FIG. 3, types of peripheral environmental information recorded in the storage unit 307 by the log recording unit 305 may include datetime information, weather information, position information, and peripheral status detailed information.

The datetime information includes, for example, date, day of the week, time of day, etc. Accordingly, a user, etc., of the support device 300 may analyze, for example, a correlation between the classification of date, day of the week, time zone, etc., and the unstable state that occurred in the shovel 100 or that was indicated to occur.

The weather information includes information on weather categories, such as fine, cloudy, rainy, snow, etc. Accordingly, a user, etc., of the support device 300 may analyze, for example, a correlation between a weather-related classification and an unstable state that occurred in the shovel 100 or that was indicated to occur.

The position information includes information about the coordinates corresponding to the position of the shovel 100 in a predetermined coordinate system, such as, for example, a global coordinate system with longitude, latitude, and altitude, or a local coordinate system as defined in a work site, etc. The position information may be geo code information, such as GeoHash. Accordingly, an administrator or the like of the management device 200 or a user of the support device 300 can find, for example, where in the work site an unstable state (particularly, a topographic unstable state) of the shovel 100 or any indication thereof has occurred. The management device 200 may generate, for example, map information (hereinafter, "unstable state map information") on a position at which an unstable state of the shovel 100 or an indication of occurrence of an unstable state has occurred in the work site. Accordingly, the management device 200 can alert a user through the support device 300. Furthermore, an administrator, etc., of the management device 200 or a user of the support device 300 can refer to the unstable state map information and formulate a construction plan or the like that takes more safety into consideration. An administrator or the like of the management device 200 may also modify a mode of control of the shovel 100 to limit a motion (speed) of the shovel 100, for example, in a location at which an unstable state (particularly, a topographic unstable state) tends to occur in a work site. Accordingly, it is possible to effectively suppress occurrence of an unstable state of the shovel 100. A use or the like of the support device 300 may conduct an analysis of a correlation, etc., between the classification of the geographical location information (e.g., the work site) and the unstable state that occurred or the unstable state with the indication to occur in the shovel 100.

The peripheral status detailed information includes, for example, image information, topographic information, and peripheral monitoring control information, as described above. Accordingly, based on the image information, the controller 30 can detect a detailed condition in the vicinity of the shovel 100 at a time at which an unstable state occurs in the shovel 100 or at a time at which there is an indication of occurrence of an unstable state in the shovel 100. As a result, a user or the like of the support device 300 can conduct an analysis on a correlation, etc., between a detailed condition in the vicinity of the shovel 100 and an unstable state that occurs in the shovel 100 or an unstable state with an indication of occurrence. The controller 30 may further detect a topographic condition of the work site in the vicinity of the shovel 100 based on the topographic information (e.g., three-dimensional data of a landform). Accordingly, a user, etc., of the support device 300 may conduct an analysis on a correlation, etc., between a detailed topographic condition in the vicinity of the shovel 100 and an unstable state that occurred in the shovel 100 or an unstable state with an indication of occurrence. The controller 30 may further detect a situation on presence or absence of a monitoring target (e.g., a person, such as a worker) that may exist in a monitored area in the vicinity of the shovel 100 based on the peripheral monitoring control information.

Accordingly, a user or the like of the support device 300 may conduct an analysis on a correlation, etc., between a detailed condition on presence or absence of a monitoring target in the monitored area in the vicinity of the shovel 100 and an unstable state that occurs in the shovel or an unstable state with an indication or occurrence.

A type of shovel related information recorded in the storage unit 307 by the log recording unit 305 includes shovel specific information (shovel identification information), operator information, and shovel state information.

The shovel identification information is identification information for identifying the shovel 100. For example, the shovel identification information is a predefined machine number, a shovel ID (Identifier), etc. The information retrieving unit 304 retrieves shovel identification information in a manner in which, for example, a machine number, etc., registered (stored) in advance to the storage unit 307, etc., is read out. Accordingly, a user, etc., of the support device 300 may conduct an analysis, etc., of an unstable state that occurs in the shovel 100 or an unstable state with an indication of occurrence for each of a plurality of shovels 100.

The operator information includes operator identification information, as operator specific information during operation, and biometric information on an operator (hereinafter, "operator biometric information"), as information relating to various states of the operator during operation (hereinafter, "operator status information").

The operator identification info nation is the identification information for identifying an operator operating the shovel 100 and is a predetermined operator ID, etc. Accordingly, a user or the like of the support device 300 may conduct an analysis of a correlation between an operator and an unstable state that occurs in the shovel 100 or an unstable state with an indication of occurrence.

The operator biometric information includes, for example, an electroencephalogram, an electrocardiogram, or the like of an operator operating the shovel 100. Accordingly, the controller 30 can detect a health condition or psychological state of an operator operating the shovel 100. Accordingly, a user or the like of the support device 300 may analyze a correlation, etc., between a health condition or a psychological state of an operator operating the shovel 100 and an unstable state occurs in the shovel 100 or an unstable state with an indication of occurrence.

The shovel state information recorded in the storage unit 307 by the log recording unit 305 may include operation mode information, engine speed information, work type information, unstable state information, stability information, vehicle tilt state information, crawler direction information, attachment posture information, operation state information, attachment driving state information, stabilization control information, etc.

The operating mode information is information on a selected operating mode of a plurality of operating modes corresponding to a high revolution number or a low revolution number that is set to the engine 11 operated at a constant speed. The operating modes include, for example, an SP (Super Power) mode in which the set revolution number of the engine 11 is relatively high and work speed is prioritized, an H (Heavy) mode in which the set revolution number of the engine 11 is moderate and is suitable for heavy work in which the workload is relatively high, and an A (Auto) mode in which the set revolution number of the engine 11 is relatively low and a wide range of work can be supported.

The engine revolution number information is, for example, information on a set value (set revolution number) an actual measured value (measured revolution number) of a revolution number of the engine 11 which is controlled to operate at a constant revolution number.

The work type information is information on a work type performed by the shovel 100. The information retrieving unit 304 obtains work type information based on, for example, detected information on the cylinder pressure of the boom cylinder 7 and the arm cylinder 8 input from the state detecting device 42 and detected information from the pressure sensor 15*a* corresponding to an operation state of the operation device 26. Accordingly, a user or the like of the support device 300 may analyze a correlation, etc., between an operation type of the shovel 100 and an unstable state that occurs in the shovel 100 or an unstable state with an indication of occurrence.

The unstable state type information is information on a type of an unstable state of the shovel 100 that occurs or for which an indication of occurrence is detected. The unstable state type information may be, for example, information representing a static unstable state, a dynamic unstable state, or a topographical unstable state of the shovel 100. The information on a type of an unstable state may also be information representing a further type in the static unstable state, the dynamic unstable state, or the topographical unstable state. For example, the information on the type of the unstable state may be, in the case of the static unstable state, information representing a distinction among a first unstable posture state, a second unstable posture state, a third unstable posture state, etc. The information on the type of the unstable state may be, in the case of the dynamic unstable state, information indicating a distinction among a forward sliding unstable state, a backward sliding unstable state, a front part floating unstable state, a rear part floating unstable state, and an oscillation unstable state. The information on the type of the unstable state may be, in the case of the topographical unstable state, information representing a distinction among a topographical sliding unstable state, a topographical tilt unstable state, and a topographical oscillation unstable state. Accordingly, a user or the like of the support device 300 may conduct an analysis on an unstable state that occurs in the shovel 100 or an unstable state with an indication of occurrence for each type of an unstable state that occurs in the shovel 100 or an unstable state with an indication of occurrence.

The stability information is information representing the stability of the shovel 100. For example, the stability information is a static stability index value of the shovel 100 or an index value (dynamic stability index value) that represents the dynamic stability of the shovel 100, which is described later.

The vehicle body tilt state information is information on a tilt state of the vehicle body (the upper turning body 3) that affects an unstable state of the shovel 100. The vehicle body tilt state information is, for example, information on a tilt angle in a longitudinal direction of the upper turning body 3 (that is, an extension direction of the attachments when the upper turning body 3 is viewed in a plane view). Accordingly, a user, etc., of the support device 300 can conduct an analysis of a correlation, etc., between an occurrence or an indication of an unstable state and a vehicle body tilt state.

The crawler orientation information is information on a crawler orientation. The crawler orientation information is, for example, a relative angle between an orientation of the upper turning body 3 (the front-rear direction) and a traveling direction of the lower traveling body 1. Accordingly, a user or the like of the support device 300 may conduct an analysis of a correlation between occurrence or indication of an unstable state and a crawler orientation.

The attachment posture information is information on a posture of attachments. The attachment posture information includes, for example, information on posture angles of attachments, i.e., a boom angle, an arm angle, and a bucket angle. The attachment posture information also includes information on, for example, acceleration or angular acceleration of at least one of the boom 4, the arm 5, and the bucket 6. The attachment posture information may also include, for example, information about a position of the bucket 6, which is an end attachment. Accordingly, a user or the like of the support device 300 can conduct an analysis of a correlation, etc., between an occurrence or an indication of an unstable state and a posture of attachments.

The attachment driving information is information on a driving state of attachments, i.e., information on motions of actuators driving the attachments. The attachment driving information includes, for example, a cylinder pressure (hydraulic pressure at the rod side oil chamber and the bottom side oil chamber) of at least one of the boom cylinder 7, the arm cylinder 8, and the bucket cylinder 9. Accordingly, an analysis can be conducted on a correlation, etc., between an occurrence or an indication of an unstable state and a driving state of an attachment.

The operation state information is information on operation states of various operating elements (the lower traveling body 1, the upper turning body 3, the boom 4, the arm 5, and the bucket 6) with respect to the operation device 26. The operation state information includes information on an operation amount and an operation direction of each of the various operation elements (e.g., a distinction between a lifting direction and a lowering direction of the boom 4, a distinction between an opening direction and a closing direction of the arm 5, bucket 6, etc.). Accordingly, a user or the like of the support device 300 can conduct an analysis on a correlation, etc., between an occurrence or an indication of an unstable state and operation states of attachments.

The stabilization control information is information on a control state of the stabilization control that suppresses an unstable motion of the shovel 100. The stabilization control information includes information on ON/OFF of the stabilization control function, presence or absence of the stabilization control operation, and details of the control during the stabilization control operation (for example, a control amount, such as a control current for controlling the boom cylinder 7 and the arm cylinder 8 to be controlled). Accordingly, a user, etc., of the support device 300 can analyze a degree intervention of the control, that is, a degree of correction, by the control, of an operation by an operator, etc., based on a control state during operation of the stabilization control. In addition, a user, etc., of the support device 300 may analyze, for example, whether the stabilization control is operating normally in response to an indication of an unstable state.

Note that the type of information recorded as the unstable state log information may include information on a control state related to control functions other than the stabilization control.

Referring back to FIG. 1 and FIG. 2, the log transmitting unit 306 (an example of the information management unit) transmits (uploads) the unstable state log information 3070 recorded in the storage unit 307 to the management device 200 through the communication device 60. Upon transmitting the unstable state log information 3070 to the management device 200, the log transmitting unit 306 deletes the unstable state log information 3070 from the storage unit 307. The log transmitting unit 306 may retain the unstable state log information 3070 for a predetermined period after transmission to the management device 200 and delete the information thereafter.

For example, the log transmitting unit 306 transmits the unstable state log information 3070 recorded in the storage unit 307 to the management device 200 at a predetermined timing after the previous transmission. Such predetermined timing includes, for example, at a time of starting the shovel 100, at a time of stopping the shovel 100, etc.

For example, the log transmitting unit 306 transmits the unstable state log information 3070 to the management device 200 upon detecting that an occupancy rate of the storage area prepared for the unstable state log information 3070 exceeds a predetermined reference rate. Accordingly, the log transmitting unit 306 may delete the unstable state log information 3070 uploaded to the management device 200 and secure a storage area for the unstable state log information 3070 in preparation for the next occurrence or indication of the unstable state of the shovel 100.

<Configuration of the Management Device>

The management device 200 includes a control device 210 and a communication device 220.

The control device 210 controls various operations in the management unit 200. The control device 210 includes a log retrieving unit 2101, a log related information generating unit 2102, and a log related information delivery unit 2103, as functional units implemented by executing, for example, one or more programs stored in ROM or non-volatile auxiliary storage devices on the CPU. The control device 210 includes, for example, a storage unit 2100 as a storage area defined in a non-volatile internal memory, such as, an auxiliary storage device.

Note that the storage area corresponding to the storage unit 2100 may be provided in an external storage device that is communicatively connected to the control device 210.

The communication device 220 is any device that communicates with an external device, such as the shovel 100 and the support device 300, through the communication network NW.

The log retrieving unit 2101 (an example of the information retrieving unit) retrieves the unstable state log information received from the shovel 100 through the communication device 220 from a receiving buffer, etc., and records the information in the storage unit 2100. At this time, the log retrieving unit 2101 constructs, in the storage unit 2100, a log information DB (Data Base) 2100A (an example of a database) in which the unstable state log information is organized, so that unstable state log information corresponding to a specific round that matches a condition on details of unstable state log information can be extracted from the unstable state log information for each of rounds in which an unstable state has occurred or potentially occurred in the shovel 100. Accordingly, the control device 210 (the log related information generating unit 2102, which is described below) can easily and quickly extract the appropriate unstable state log information and generate the log related information in response to a request from a user.

For example, FIG. 4 (FIGS. 4A to 4C) is a diagram illustrating an example of a history of unstable state log information (hereinafter, "unstable state log history information") recorded (accumulated) in the management device 200 (the storage unit 2100).

Specifically, FIGS. 4A and 4B are diagrams illustrating portions of the unstable state log history information that correspond to information at the time of occurrence of an unstable state/indication, and FIG. 4C is a portion of the unstable state log history information that corresponds to information before occurrence of an unstable state/indication and after occurrence of an unstable state/indication. The information in the same row in FIGS. 4A-4C corresponds to occurrence of an unstable state or an indication in a same round but is illustrated in a state in which the row is divided in three pieces for convenience.

As illustrated in FIG. 4A and FIG. 4B, in the example, the type of the peripheral environment information and the shovel related information (the shovel specific information, the operator information, and the shovel state information) illustrated in FIG. 3 is recorded in the storage unit 2100, as the unstable state log information at a time of occurrence of an unstable state/indication.

As illustrated in FIG. 4C, in the example, the vehicle body tilt state information and the operation state information, which are dynamic information among the type of the peripheral environment information and the shovel related information illustrated in FIG. 3, are recorded in the storage unit 2100 as the unstable state log information before occurrence of an unstable state/indication and after occurrence of an unstable state/indication.

Note that the unstable state log information may include only information corresponding to either of the two conditions, not both before occurrence of an unstable state/indication and after occurrence of an unstable state/indication. That is, the log recording unit 305 of the shovel 100 may record unstable state log information including only information corresponding to either one of the two rather than both before occurrence of an unstable state/indication and after occurrence of an unstable state/indication.

As described above, the log retrieving unit 2101 accumulates unstable state log information uploaded from the shovel 100 for each round in the storage unit 2100 historically. Accordingly, the management device 200 can provide unstable state log related information generated based on the unstable state log history information to a user, etc., of the support device 300, as described below.

Referring back to FIG. 1 and FIG. 2, the log related information generating unit 2102 generates log related information according to a signal requesting to retrieve unstable state log related information ("log related information retrieving request," hereinafter) received from the support device 300 through the communication device 220, or automatically.

For example, the log related information generating unit 2102 generates, as the unstable state log related information, information in a table form ("unstable state log record extraction information," hereinafter) obtained by extracting unstable state history information that matches a condition related to content of the unstable state log information from the unstable state log history information. Details of the unstable state log record extraction information are described below (see FIG. 11).

For example, the log related information generating unit 2102 generates, as the unstable state log related information, statistical information ("unstable state log statistical information," hereinafter) related to an unstable state of the shovel 100 based on the unstable state log history information. Details of the unstable state log statistical information are described below (see FIG. 12 through FIG. 17).

For example, the log related information generating unit 2102 generates, as the unstable state log related information, map information related to a location of the shovel 100 at a time at which an unstable state or an indication of an unstable state occurs, i.e., unstable state map information. Accordingly, an administrator of the management device 200 or a user of the support device 300 can find, from the unstable state map information, a location at which an unstable state of the shovel 100 tends to occur, etc. The log related information generating unit 2102 may generate unstable state map information for each of a dynamic unstable state, a static unstable state, and a topographical unstable state. Accordingly, an administrator, etc., of the management device 200 or a user of the support device 300 can find a tendency, etc., of a location at which a static unstable state of the shovel 100 tends to occur and a location at which a dynamic unstable state of the shovel 100 tends to occur. Furthermore, an administrator, etc., of the management device 200 or a user of the support device 300 can find a location at which a topographical unstable state tends to occur, a landform thereof, etc., from the map information related to the topographical unstable state. Furthermore, the log related information generating unit 2102 may generate unstable state map information for each predetermined area (for example, for each work site). Accordingly, an administrator, etc., of the management device 200 or a user of the support device 300 can utilize the unstable state map information specialized to the work site, etc., related to the administrator, etc., of the management device 200 or the user of the support device 300. As a result, an administrator, etc., of the management device 200 or a user of the support device 300 can create, for example, a construction plan that takes more safety into consideration at each work site. The details of the map information are described below (see FIG. 18).

A function of the log related information generating unit 2102 may be included in the log information DB2100A. That is, the log information DB 2100A may be a database from which unstable state log information based on a predetermined information can be extracted and a database that is arranged so that unstable state log statistical information based on a predetermined condition can be generated. The management device 200 may also modify a mode of control of the shovel 100 to limit a motion (speed) of the shovel 100 at a location in a work site at which an unstable state (particularly, a topographic unstable state) or an indication thereof tends to occur. Specifically, the management device 200 may deliver a corresponding control program to the shovel 100. As a result, the shovel 100 can suppress occurrence of an unstable state by applying a different control mode of the shovel 100 (e.g., a target value or a control limit value) depending on a location of the shovel 100 in a work site.

The log related information delivery unit 2103 delivers (transmits), through the communication device 220, the unstable state log related information generated by the log related information generating unit 2102 to the support device 300 that is the transmission source of the log related information retrieving request. Accordingly, the display device 340 of the support device 300 displays the delivered unstable state log related information, as described below (see FIG. 11 through FIG. 17). Namely, the management device 200 (the control device 210) causes the display device 340 of the support device 300 to display the unstable state log related information by delivering the unstable state log related information to the support device 300.

<Configuration of the Support Device>

The support device 300 includes a control device 310; a communication device 320; an operation device 330; and a display device 340.

The control device 310 controls various operations of the support device 300. The control device 310 includes, for example, a log related information retrieving unit 3101; and a log related information display processing unit 3102, as functional units implemented by executing one or more programs stored in a CPU or a non-volatile auxiliary storage device. The functions of the log related information retrieving unit 3101 and the log related information display processing unit 3102 may be enabled by starting a predetermined application program ("unstable state log viewing application," hereinafter) installed in the control device 310 in response to a predetermined operation on the operation device 330 by a user.

The communication device 320 is a device that communicates with a device outside the support device 300, such as the management device 200, through the communication network NW. The communications device 320 is, for example, a mobile communication module that conforms to a mobile communication standard, such as LTE, 4G, and 5G.

The operation device 330 receives various operations on the support device 300 by a user. The operation device 330 includes, for example, buttons, a keyboard, a mouse, a touchpad, an operation unit implemented by hardware, such as a touch panel installed in the display device 340. The operation device 330 may be a combination of an operation unit implemented by hardware, such as a touch panel implemented in the display device 340, and an operation unit implemented by software, such as a button icon on an operation screen displayed on the display device 340.

The display device 340 displays various types information images. The display device 340 may be, for example, a liquid crystal display or an organic EL display.

Figure 19:
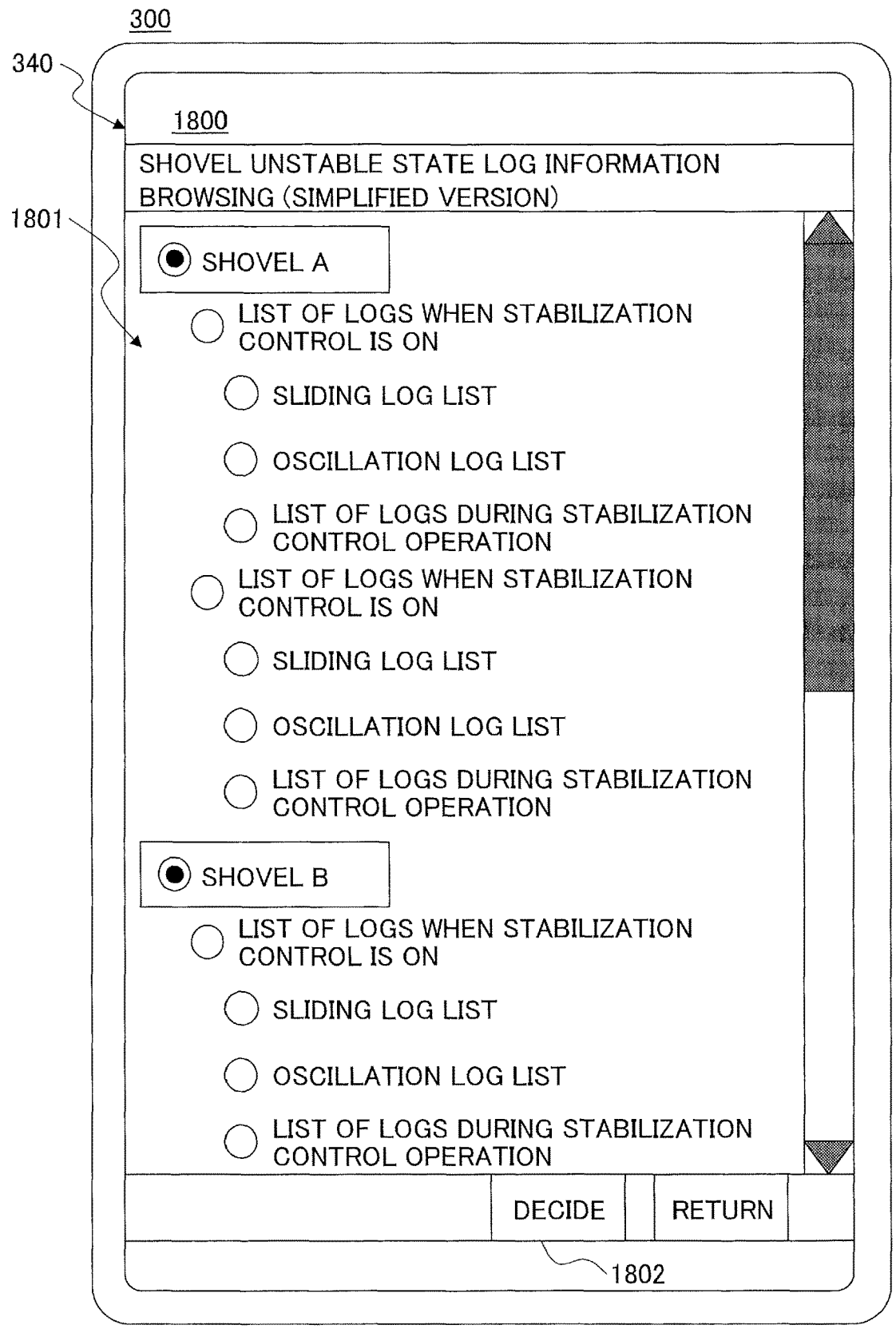
FIG. 19 is a diagram illustrating an example of an operation screen for retrieving unstable state log related information displayed on a display device of a support device.
Figure 20:
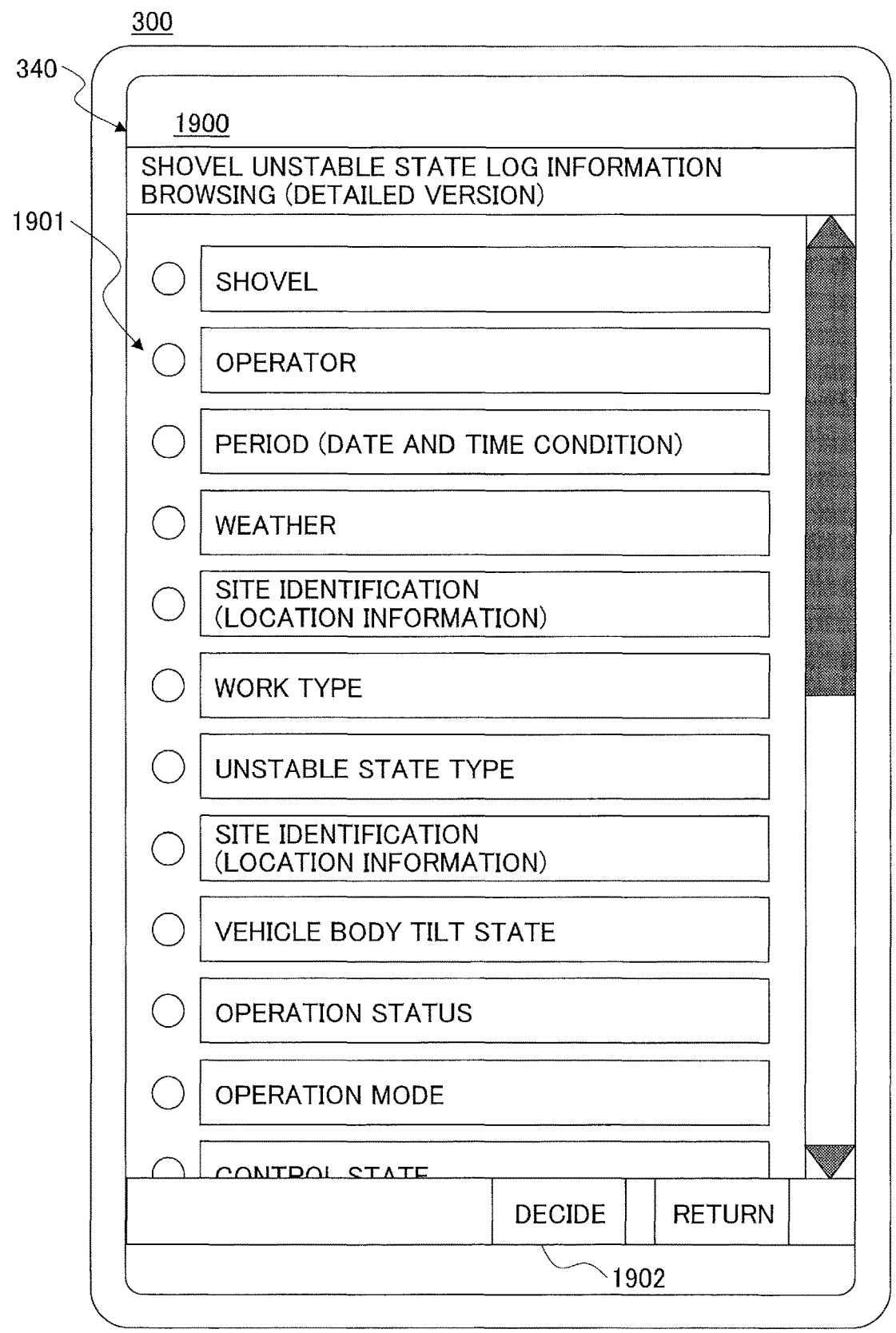
FIG. 20 is a diagram illustrating another example of an operation screen for retrieving unstable state log related information displayed on a display device of a support device.

The log related information retrieving unit 3101 transmits a log related information retrieving request for requesting to obtain unstable state log related information to the management device 200 through the communication device 320 in accordance with an operation on the operation device 330. The log related information retrieving request includes information related to a specification (specification information) of unstable state log related information that is required to be obtained. For example, for requesting to obtain the unstable state log extraction information, the specification information is information related to a condition for extracting unstable state log extraction information from the log information DB2100A. When the unstable state log statistical information is required to be obtained, the specification information includes, for example, various types of conditions for generating (calculating) specific statistical information. For example, the log related information retrieving unit 3101 determines specification information according to operation content input by an operator through an operation screen for retrieving the unstable state log related information ("unstable state log related information retrieving operation screen," hereinafter). The details of the unstable state log related information retrieving operation screen are described below (FIG. 19 and FIG. 20).

The log related information display processing unit 3102 causes the display device 340 to display the unstable state log related information received from the management device 200 through the communication device 320.

[The Unstable Motion and Dynamic Unstable State of the Shovel]

Next, an unstable motion and a dynamic unstable state of the shovel 100 are described with reference to FIG. 5 through FIG. 10.

<The Forward Sliding Motion and the Forward Sliding Unstable State>

Figure 5:
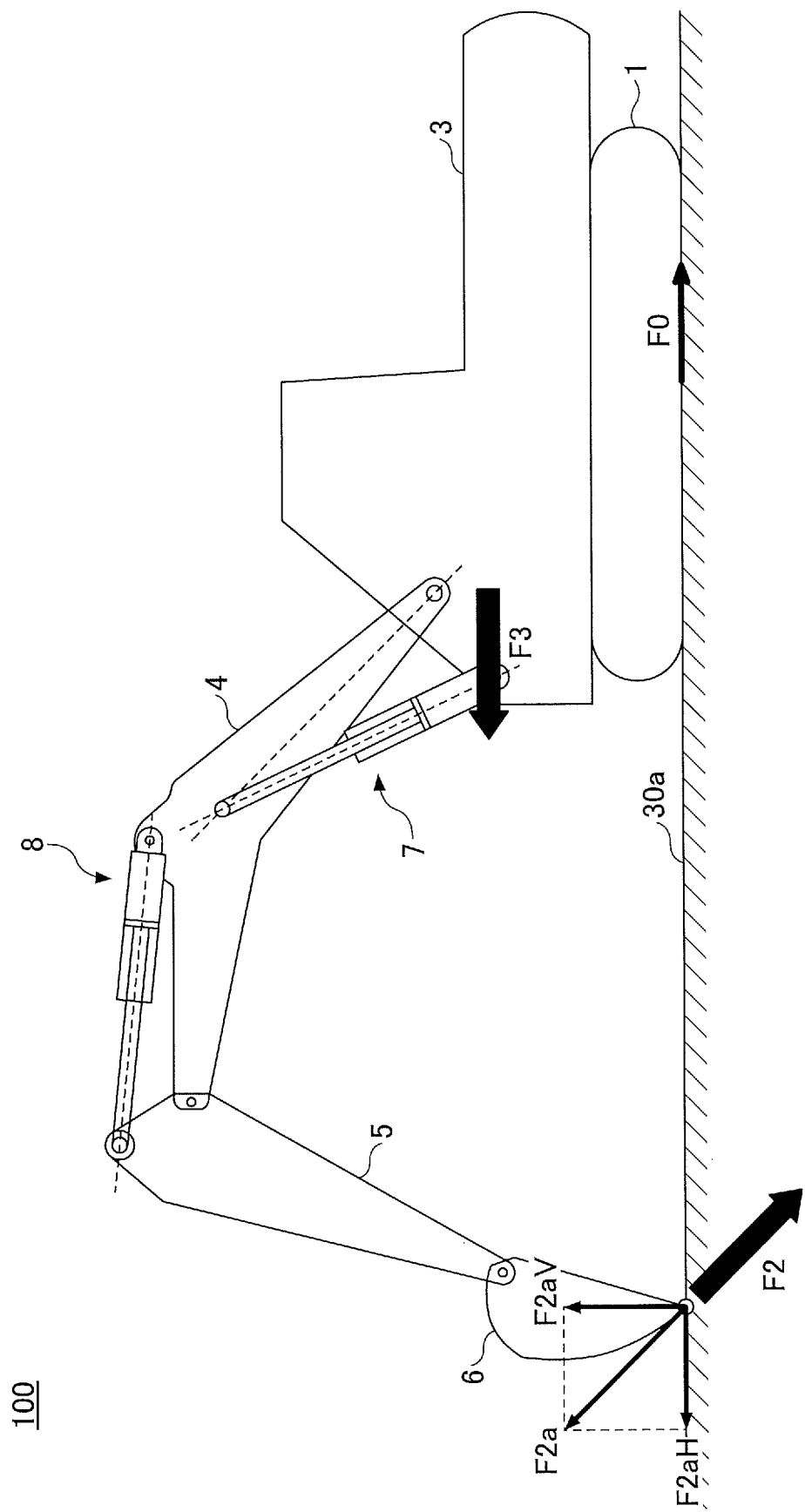
FIG. 5 is a diagram illustrating a forward sliding motion of a shovel.

FIG. 5 is a diagram illustrating a forward sliding motion that is an example of an unstable motion of the shovel 100. Specifically, FIG. 5 is a diagram illustrating an operating state of a shovel 100 in which a forward sliding motion occurs.

As illustrated in FIG. 5, the shovel 100 is performing excavation work of the ground surface 30a. The force F2 in an obliquely downward direction near the vehicle body of the shovel 100 (the lower traveling body 1, the turning mechanism 2, and the upper turning body 3) acts from the bucket 6 to the ground surface 30a mainly by the closing operation of the arm 5 and the bucket 6. At this time, a reaction force F2 acting on the bucket 6, that is, a reaction force F3 corresponding to a horizontal component F2aH of the excavation reaction force F2a acts on the body of the shovel 100 (the lower traveling body 1, the turning mechanism 2, and the upper turning body 3) through an attachment. Then, when the reaction force F3 exceeds the maximum static friction force F0 between the shovel 100 and the ground surface 30a, the vehicle body slides forward.

In addition to the situation illustrated in FIG. 5, for example, when the shovel 100 is traveling in the downward direction, the shovel 100 may slide in the downward direction, depending on an operating state (for example, a rapid operation) or a moving state (for example, relatively high speed or high acceleration) of the lower traveling body 1.

As described above, the shovel 100 may be in a forward sliding unstable state in which the lower traveling body 1 of the shovel 100 is likely to slide forward with respect to the ground, for example, when the excavation reaction force is relatively high during an excavation operation. Furthermore, when the shovel 100 is traveling in the downward direction of a slope, for example, depending on an operation state or a moving state of the lower traveling body 1, the shovel 100 may be in a forward sliding unstable state in which the shovel 100 is likely to slide in the downward direction.

Note that a case in which the lower traveling body 1 slides forward due to, as a main cause, a condition of a slope of a tilted ground (e.g., geology of the ground, water content, unevenness, etc.) corresponds to a topographic unstable state (topographic sliding unstable state). For example, the unstable state determination unit 302 determines whether an operation state of the lower traveling body 1 or a moving state of the lower traveling body 1 corresponds to an operational state (for example, a rapid operation) or a moving state (for example, relatively high traveling speed, high acceleration, or the like) in which slippage can occur on a slope. Upon detecting that the state does not correspond to these states, the unstable state determination unit 302 may determine that the state is a topographic unstable state.

<The Backward Sliding Motion and Backward Sliding Unstable State>

Figure 6A:
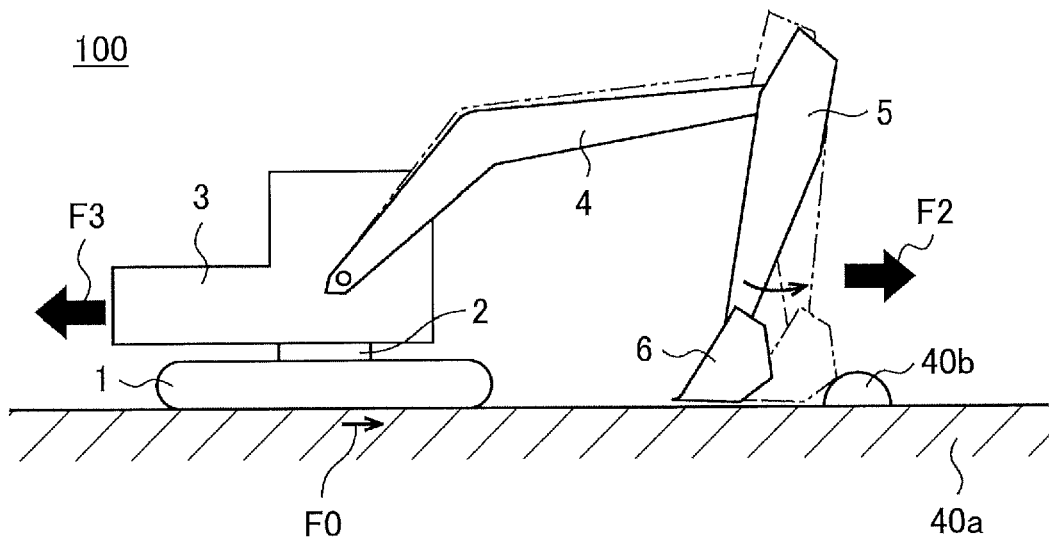
FIG. 6A is a diagram illustrating a backward sliding motion of a shovel.
Figure 6B:
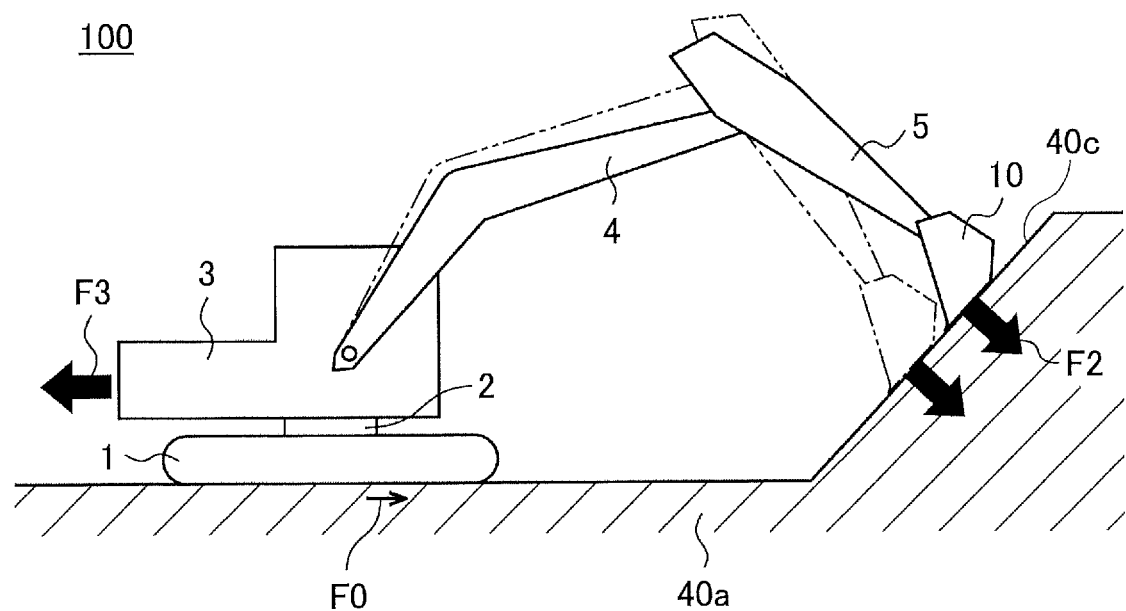
FIG. 6B is a diagram illustrating a backward sliding motion of a shovel.

FIG. 6 (FIG. 6A and FIG. 6B) is a diagram illustrating a backward sliding motion of the shovel 100. Specifically, FIG. 6A and FIG. 6B are diagrams illustrating working situations of the shovel 100 in which a backward sliding motion may occur.

As illustrated in FIG. 6A, the shovel 100 is performing the leveling operation of the ground 40a, and force F2 is acting on the ground 40a so that the bucket 6 presses the soil 40b forward, mainly by the opening operation of the arm 5. At this time, the reaction force of the force F2 acts on the bucket 6, and force F3 corresponding to the reaction force acts from the attachment so as to slide the vehicle body backward. Accordingly, when the reaction force F3 exceeds the maximum static friction force F0 between the shovel 100 and the ground surface 40a, the vehicle body slides backward.

Furthermore, as illustrated in FIG. 6B, the shovel 100 presses, for example, the bucket 6 against a slope surface 40c of the tilted bank part mainly by an opening movement of the arm 5 so as to perform leveling (rolling) work of the slope surface 40c. At this time, the reaction force of the force F2 pressing the slope surface 40c acts on the bucket 6, and the force F3 corresponding to the reaction force acts from the attachment to slide the vehicle body backward.

Accordingly, similar to the case of FIG. 6A, when the reaction force F3 exceeds the maximum static frictional force F0 between the shovel 100 and the ground surface 40a, the vehicle body slides backward.

As described above, for example, when backward reaction force acting on the bucket 6 becomes relatively large during a leveling operation or a rolling operation, the shovel 100 may be in a backward sliding unstable state in which the lower traveling body 1 of the shovel 100 likely slides backward relative to the ground.

<The Front Part Floating Motion and Front Part Floating Unstable State>

FIG. 7 (FIG. 7A through FIG. 7F) are diagrams illustrating a front part floating motion. Specifically, FIG. 7A through FIG. 7F are diagrams illustrating working situations of the shovel 100 in which a front part floating motion may occur.

Figure 7A:
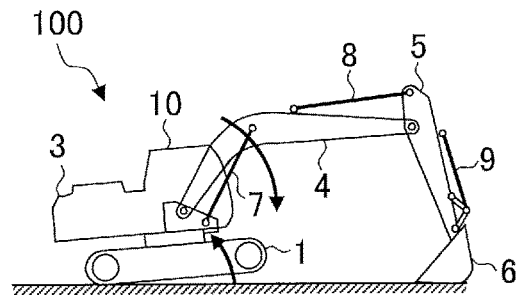
FIG. 7A is a diagram illustrating a front part floating motion of a shovel.
Figure 7B:
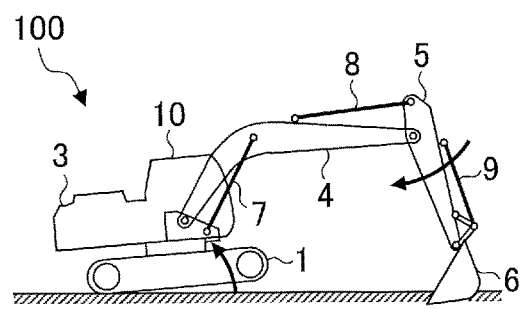
FIG. 7B is a diagram illustrating a front part floating motion of a shovel.

FIG. 7A is a diagram schematically illustrating a situation of a rolling operation of the shovel 100 by the lowering operation of the boom 4 (hereinafter, "boom lowering operation"). FIG. 7B is a diagram schematically illustrating a situation of a first half process of an excavation work of the shovel 100 by the closing operation of the arm 5 (hereinafter, "arm closing operation").

As illustrated in FIG. 7A, when a boom lowering operation is performed and a back surface of the bucket 6 is pressed against the ground, reaction force from the ground acts on the bucket 6, and the reaction force acts on the vehicle body through the attachment. Furthermore, as illustrated in FIG. 7B, when the arm lowering operation is performed and the tip of the bucket 6 (the toe) is dug into the ground, excavation reaction force from the ground acts on the bucket 6, and the reaction force acts on the vehicle body through the attachment. Specifically, a vertical component of the reaction force acting on the bucket 6 acts as a moment in a pitching direction (hereinafter, "backward tilting moment") that causes the shovel 100 to tilt backward with respect to the vehicle body, i.e., to float the front part of the lower traveling body 1. As a result, when the backward tilting moment exceeds a moment in the pitching direction to press the vehicle body against the ground based on gravity, the front part of the vehicle body (the lower traveling body 1) may float.

Figure 7C:
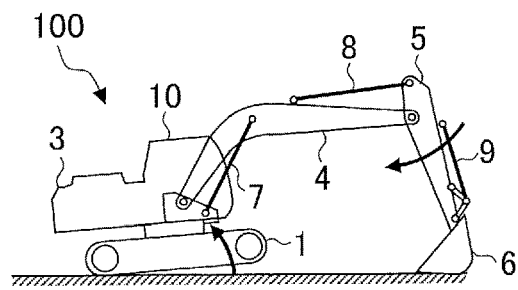
FIG. 7C is a diagram illustrating a front part floating motion of a shovel.
Figure 7D:
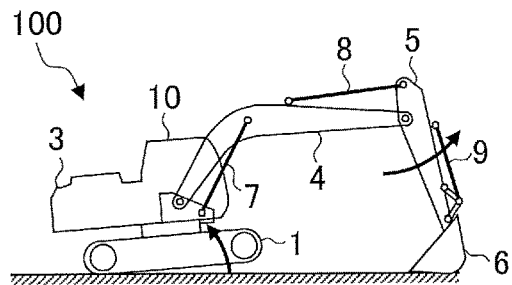
FIG. 7D is a diagram illustrating a front part floating motion of a shovel.

FIG. 7C and FIG. 7D are diagrams schematically illustrating situations of a leveling operation of the shovel 100 by the arm closing operation and an opening operation of the arm 5 ("the arm opening operation," hereinafter), respectively.

As illustrated in FIG. 7C and FIG. 7D, even if the arm closing operation and the arm opening operation are performed and the tip and the back surface of the bucket 6 level portions in the vicinity of the ground surface, relatively large reaction force may act on the bucket 6 depending on the unevenness of the ground surface, the hardness of the ground, and the like. Similar to the rolling operation and the excavation operation in FIG. 7A and FIG. 7B, the vertical component of the reaction force acting on the bucket 6 acts as the backward tilting moment on the vehicle body, and, as a result, the front part of the vehicle body (the lower traveling body 1) may float.

Figure 7E:
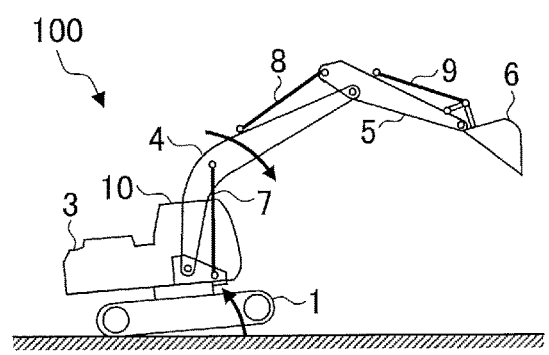
FIG. 7E is a diagram illustrating a front part floating motion of a shovel.

FIG. 7E is a diagram schematically illustrating an operation state of the shovel 100 in which the boom 4 rapidly accelerates in the downward direction from a state in which all the attachments are stopped.

As illustrated in FIG. 7E, when the boom lowering operation is started and the attachment is rapidly accelerated from the stopped state, a moment in the pitching direction opposite to the rotation direction (the lowering direction) of the attachment (boom 4), that is, the backward tilting moment acts on the vehicle body (the upper turning body 3) from the attachment. As a result, when the backward tilting moment exceeds the moment in the pitching direction to press the vehicle body against the ground based on gravity, the front part of the vehicle body (the lower traveling body 1) may float.

Figure 7F:
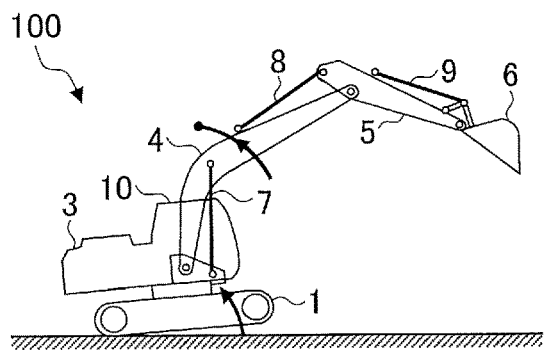
FIG. 7F is a diagram illustrating a front part floating motion of a shovel.

FIG. 7F is a diagram schematically illustrating an operation state of the shovel 100 in which the boom 4 stops abruptly during a boom raising operation.

As illustrated in FIG. 7F, when the boom raising operation is performed and the boom 4 stops abruptly during that operation, the moment in the pitching direction of the rotation direction (the raising direction) of the attachment (boom 4) before the sudden stop, that is, the backward tilting moment acts on the vehicle body (the upper turning body 3) from the attachment. As a result, when the backward tilting moment exceeds the moment in the pitching direction to press the vehicle body against the ground based on gravity, the front part of the vehicle body (the lower traveling body 1) may float.

As described above, when the reaction force from the ground acting on the bucket 6 becomes relatively large, the backward tilting moment acting on the vehicle body through the attachment becomes large, and a state of the shovel 100 may become a front part floating unstable state in which it is highly likely that the front part of the lower traveling body 1 floats. Furthermore, a state of the shovel 100 may become a front part floating unstable state in which it is highly likely that the front part of the lower traveling body 1 floats due to the backward tilting moment caused by the reaction that acts on the vehicle body from the attachment in response to the sudden stop or the sudden acceleration of the attachment (boom 4).

The front part floating unstable states corresponding to FIG. 7A through FIG. 7F are the dynamic unstable states of the shovel 100 caused by an operation of attachments by an operator. However, the front part floating unstable state of the shovel 100 may be caused by an external factor.

For example, when the shovel 100 is working on a narrow work road part partially developed on a tilted area, if the ground in the vicinity of the rear part of the vehicle body of the shovel 100 is fragile, the part may collapse and the front part of the lower traveling body 1 may float. As a result, the shovel 100 may fall backward. Namely, the shovel 100 may be in a topographic unstable state (a topographical floating unstable state) due to a topographical condition of the work site at which the shovel 100 is working.

<The Rear Part Floating Motion and Rear Part Floating Unstable State>

FIG. 8 (FIG. 8A through FIG. 8H) are diagrams illustrating a rear part floating motion. Specifically, FIG. 8A through FIG. 8H illustrate working situations of the shovel 100 in which a rear part floating motion may occur.

Figure 8A:
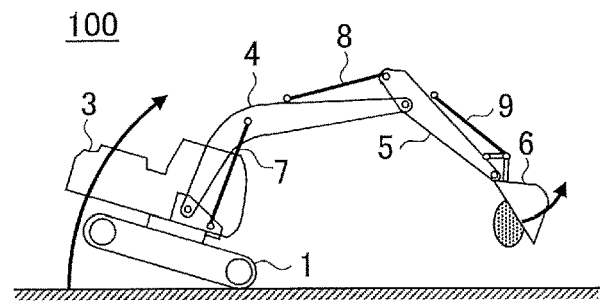
FIG. 8A is a diagram illustrating a rear part floating motion of a shovel.
Figure 8B:
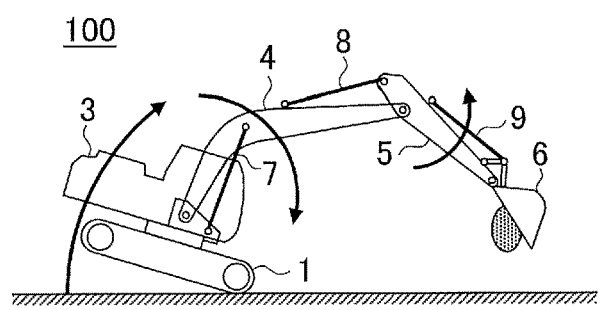
FIG. 8B is a diagram illustrating a rear part floating motion of a shovel.

FIG. 8A is a diagram schematically illustrating a situation of a sediment removal work of the shovel 100 by an opening operation of the bucket 6 ("bucket opening operation," hereinafter). FIG. 8B is a diagram schematically illustrating a situation of a sediment removal work of the shovel 100 by a boom lowering operation and an arm opening operation.

As illustrated in FIG. 8A and FIG. 8B, when a bucket opening operation or a boom lowering operation and an arm opening operation are performed, the earth and sand in the bucket 6 is discharged outside, resulting in a change in the moment of inertia of the attachment of the shovel 100. As a result, the change in the moment of inertia causes a moment in the pitching direction to act on the vehicle body to overturn the vehicle body in the forward direction ("forward tilting moment," hereinafter). When the forward tilting moment exceeds the moment in the pitching direction to press the vehicle body against the ground based on gravity, the rear part of the body (lower traveling body 1) may float. In particular, if clayey soil is loaded on the bucket 6, the soil is not easily discharged outside. Accordingly, an operator or the like may be intentionally performed an operation, such as oscillating the attachment. During such an operation, if clayey soil peels off from the bucket 6 and is discharged outside, the rear part floating motion of the shovel 100 is promoted, partly due to the operation state.

Figure 8C:
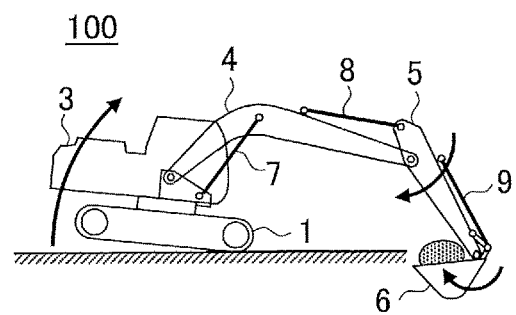
FIG. 8C is a diagram illustrating a rear part floating motion of a shovel.

FIG. 8C is a diagram schematically illustrating a situation of a latter half process of an excavation work of the shovel 100 by an arm closing operation and a closing operation of the bucket 6 (hereinafter, "bucket closing operation"), and specifically, an operation state of the shovel 100 in which earth and sand are held in the bucket 6.

As illustrated in FIG. 8C, when it is attempted to hold the earth and sand in the bucket 6 by the arm closing operation and the bucket closing operation, reaction force from the ground or the earth and sand acts on the bucket 6. As a result, the reaction force causes a forward tilting moment in the pitching direction to act on the vehicle body through the attachment to overturn the vehicle body in the forward direction, and the rear part of the vehicle body (the lower traveling body 1) may float, similar to the case of FIG. 8A, etc.

Figure 8D:
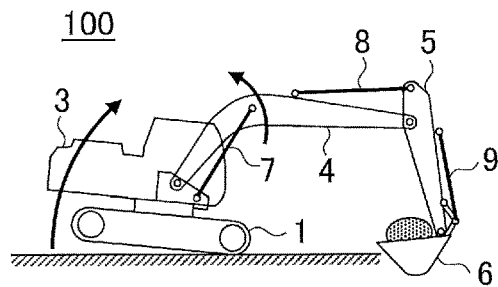
FIG. 8D is a diagram illustrating a rear part floating motion of a shovel.

FIG. 8D is a diagram schematically illustrating a state of a latter half process of an excavation work by a boom raising operation, and, specifically, a state of an operation of the shovel 100 for lifting the earth and sand held in the bucket 6.

As illustrated in FIG. 8D, when the boom 4 is lifted from a state in which the bucket 6 contacts the ground, a load of the earth and sand, etc., loaded on the bucket 6 additionally acts, resulting in a change in the moment of inertia of the attachment of the shovel 100. As a result, the change in the moment of inertia causes the forward tilting moment in the pitching direction to act on the vehicle body to overturn the vehicle body in the forward direction. Accordingly, the rear part of the vehicle body (the lower traveling body 1) may float, similar to the case of FIG. 8A, etc.

Figure 8E:
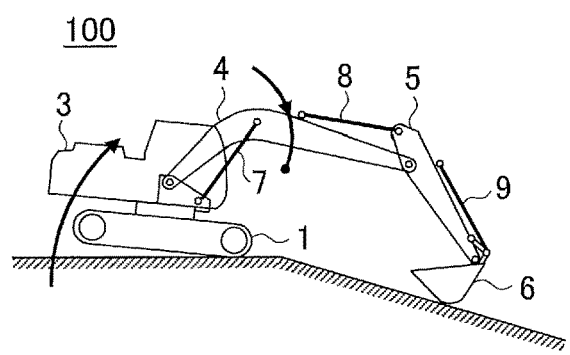
FIG. 8E is a diagram illustrating a rear part floating motion of a shovel.

FIG. 8E is a diagram schematically illustrating an operation state of the shovel 100 such that, the boom was suddenly stopped immediately above the ground after a rapid boom lowering operation, at a start of an excavation work.

As illustrated in FIG. 8E, when the boom 4 stops abruptly after a rapid boom lowering operation, a moment in the pitching direction of the rotational direction (the downward direction) of the attachment (boom 4) before the sudden stop, i.e., the forward tilting moment, acts on the vehicle body from the attachment. As a result, the rear part of the vehicle body (the lower traveling body 1) may float, similar to the case of FIG. 8A, etc., due to the forward tilting moment acting on the vehicle body from the attachment.

Figure 8F:
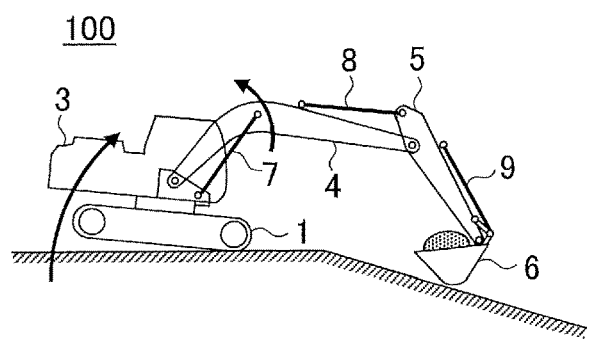
FIG. 8F is a diagram illustrating a rear part floating motion of a shovel.

FIG. 8F is a diagram schematically illustrating a state of a latter half process of an excavation work of the shovel 100 by the boom raising operation, in particular, an operating state of lifting the earth and sand, etc., held in the bucket 6 in a state in which the bucket 6 is significantly separated from the vehicle body in the horizontal direction.

As illustrated in FIG. 8F, when the bucket 6 loaded with the earth and sand, etc., is separated from the vehicle body in the horizontal direction, the moment of inertia of the attachment becomes very large. Accordingly, in this situation, when the boom 4 is lifted, the moment of reaction in the opposite direction (the downward direction) from the rotation direction (the upward direction) of the boom 4 acting on the body (the upper turning body 3) from the attachment is very large, that is, the forward tilting moment becomes very large. As a result, the rear part of the vehicle body (the lower traveling body 1) may float, similar to the case of FIG. 8A, etc., due to the forward tilting moment acting on the body from the attachment.

Figure 8G:
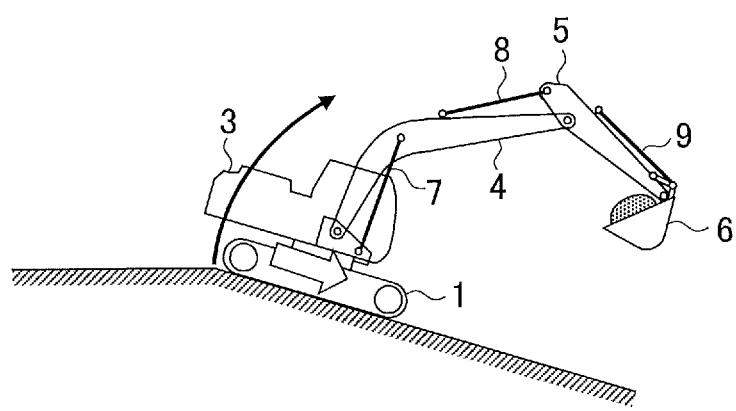
FIG. 8G is a diagram illustrating a rear part floating motion of a shovel.

FIG. 8G is a diagram schematically illustrating an operation state of the shovel 100 in which the earth and sand, etc., are loaded in the bucket 6 and the lower traveling body 1 is traveling downward on a slope.

As illustrated in FIG. 8G, when the lower traveling body 1 travels in the downward direction, the moment to press the vehicle body (the lower traveling body) against the ground based on gravity is relatively reduced. Furthermore, due to the effect of the bucket 6 loaded with the earth and sand, etc., the forward tilting moment acting on the body from the attachment relatively increases. As a result, when the forward tilting moment acting on the vehicle body (the lower traveling body 1) from the attachment exceeds the moment to press the vehicle body against the ground based on gravity, the rear part of the vehicle body (the lower traveling body 1) may float.

Note that a case in which the rear part of the vehicle body floats (overturns in the forward direction) due to, as a main cause, a condition of a slope of a tilted ground (e.g., geology of the ground, water content, unevenness, etc.) corresponds to a topographic unstable state (topographical sliding unstable state). For example, the unstable state determination unit 302 determines whether an operation state of the lower traveling body 1 or a moving state of the lower traveling body 1 (speed, acceleration, etc.) corresponds to an operational state (for example, a rapid operation) or a moving state (for example, relatively high traveling speed, high acceleration, or the like) in which overturning in the forward direction on the slope may occur. Upon detecting that the state does not correspond to these states, the unstable state determination unit 302 may determine that the state is a topographic unstable state.

Furthermore, for example, if the connection between the arm 5 and the end attachment (the bucket 6) is made by quick coupling, a phase difference may occur between the operation of the boom 4 and the arm 5 and the operation of end attachment. Then, depending on a mode of a phase delay, there may be a change in the moment of inertia in the attachment, causing the forward tilting moment in the pitching direction to act on the vehicle body to overturn the vehicle body in the forward direction. Accordingly, the rear part floating motion may occur in the shovel 100. That is, the rear part floating unstable state tends to occur in the shovel 100 due to the connection mode of the end attachment.

As described above, when the forward tilting moment acting on the vehicle body from the attachment becomes relatively large due to an operation of an attachment, a state of the shovel 100 may become the rear part floating unstable state in which it is highly likely that the rear part of the lower traveling body 1 floats. Furthermore, when the lower traveling body 1 travels in the downward direction, a moment to press the vehicle body against the ground relatively decreases, and a state of the shovel 100 may become the rear part floating unstable state in which it is highly likely that the rear part of the lower traveling body 1 floats.

The rear part floating unstable states corresponding to FIG. 8A through FIG. 8G are the dynamic unstable states of the shovel 100 caused by an operation of attachments by an operator. The rear part floating unstable state of the shovel 100 may be caused by an external factor.

Figure 8H:
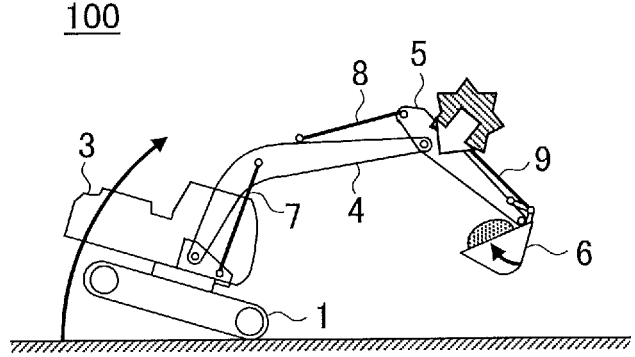
FIG. 8H is a diagram illustrating a rear part floating motion of a shovel.

For example, FIG. 8H is a diagram illustrating a situation in which a rock or the like collides with the attachment (the arm 5) of the shovel 100 from above due to a landslide or the like.

As illustrated in FIG. 8H, when a rock or the like collides with an attachment from above, the external force caused by the impact of the rock or the like acts as the forward tilting moment from the attachment to the vehicle body. As a result, the rear part of the vehicle body (the lower traveling body 1) may float, similar to the case of FIG. 8A, etc., due to the forward tilting moment acting on the body from the attachment. That is, a state of the shovel 100 may become a topographical floating unstable state due to the external force acting on the attachment caused by a landslide or the like.

For example, when the shovel 100 performs a deep drilling work in a manner to cut away cliffs from a flat part on an upland side, if the deep drilling work is advanced to a location close to the ground plane of the lower traveling body 1, the ground under the lower traveling body 11 may collapse. Then, the vehicle body (the lower traveling body 1) may tilt forward due to the collapsed ground, and the rear part of the lower traveling body 1 may float (i.e., overturn in the forward direction). Namely, a state of the shovel 100 may become a topographical floating unstable state due to the topographical condition of the work site at which the shovel 100 is working.

<The Oscillation Motion and Oscillation Unstable State>

Figure 9A:
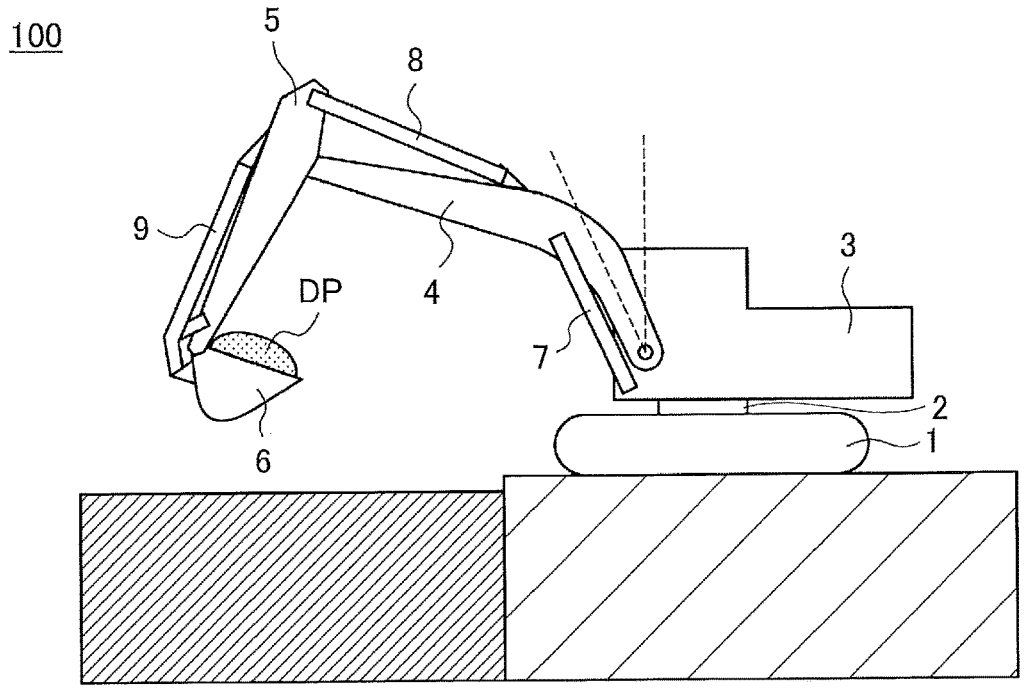
FIG. 9A is a diagram illustrating an oscillation motion of a shovel.
Figure 9B:
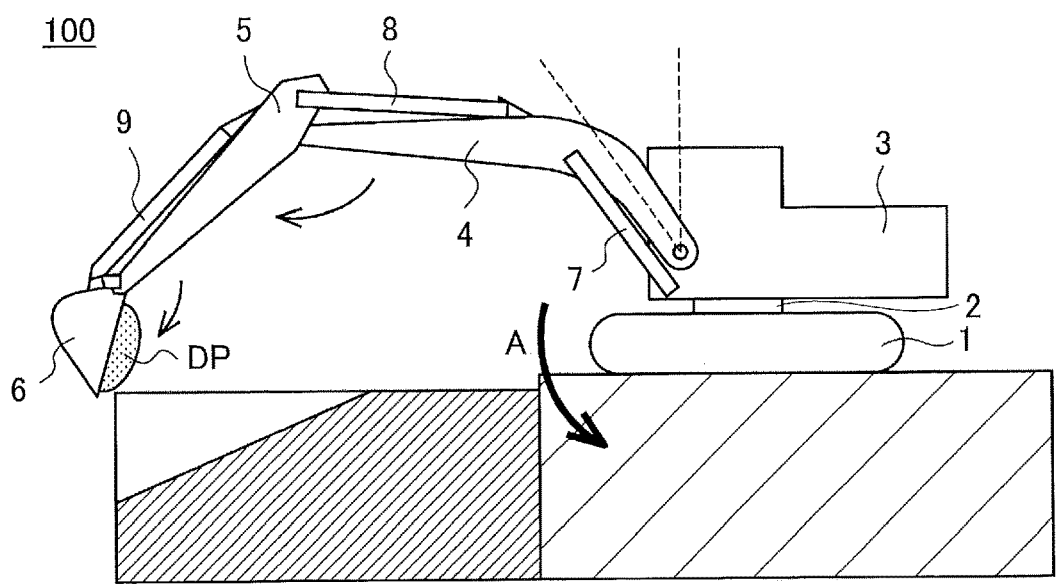
FIG. 9B is a diagram illustrating an oscillation motion of a shovel.

FIG. 9 and FIG. 10 are diagrams illustrating an example of an oscillation mode of the shovel 100. Specifically, FIG. 9 (FIG. 9A and FIG. 9B) illustrates a situation in which an oscillation motion is generated during an aerial motion of the shovel 100. FIG. 10 is a diagram illustrating a time waveform of an angle (pitch angle) and a time waveform of an angular velocity (pitch angular velocity) in the pitching direction associated with an aerial motion of the shovel 100 in the situations illustrated in FIG. 9A and FIG. 9B. In the embodiment, as an example of an aerial motion, an unloading operation is described which is for discharging a load DP in the bucket 6 to the outside.

As illustrated in FIG. 9A, the shovel 100 is in a state in which the arm 5 and the bucket 6 are closed and the boom 4 is raised relative thereto, and a load DP, such as earth and sand is accommodated in the bucket 6.

As illustrated in FIG. 9B, when a discharging operation is performed in the shovel 100 from the state illustrated in FIG. 9A, the arms 5 and the bucket 6 are opened widely, the boom 4 is lowered, and the load DP is discharged outside the bucket 6. At this time, the change in the moment of inertia of the attachment acts to oscillate the vehicle body of the shovel 100 in the pitching direction indicated by the arrow A in the figure.

At this time, as illustrated in FIG. 10, a moment (forward tilting moment) is generated (acts) to cause the shovel 100 to roll forward from the attachment to the vehicle body due to the aerial operation, specifically, the discharge operation, and an oscillation in the pitching direction is generated (see the circled part in the figure).

An oscillation motion may be generated in the shovel 100 in an operating state of the shovel in which the forward tilting moment acts on the vehicle body from the attachment, i.e., in an operating state in which the rear part floating motion illustrated in FIG. 8A through FIG. 8G, etc., may occur, other than the aerial motion illustrated in FIG. 9A and FIG. 9B.

As described above, when a relatively large forward tilting moment occurs in the vehicle body, such as a case in which the discharge operation, etc., is performed in the shovel 100, a state of the shovel 100 may become an oscillation unstable state in which an oscillation may occur.

[The Stabilization Control of Shovel]

Next, the stabilization control of the shovel 100 by the stabilization control unit 303 is described.

As described above, an unstable motion and an unstable state of the shovel 100 occur mainly due to a motion of an attachment based on an operation by an operator. Accordingly, by controlling (correcting) a motion of an attachment, the stabilization control unit 303 can suppress an unstable motion so as to avoid an unstable state of the shovel 100.

For example, at least a part of the reaction force from the ground acting on the bucket 6 acts on the vehicle body (the upper turning body 3) from the boom cylinder 7. Accordingly, the stabilization control unit 303 can suppress occurrence of an unstable motion and an unstable state of the shovel 100 by controlling an operation of the attachment in such a manner as to reduce excessive pressure in one of the bottom side oil chamber and the rod side oil chamber of the boom cylinder 7.

In particular, in a state in which a front part floating motion occurs, i.e., in a case in which a state of the shovel 100 is the front part floating unstable state, the pressure in the rod side oil chamber of the boom cylinder 7 becomes excessive. Accordingly, the stabilization control unit 303 reduces the pressure in the rod side oil chamber of the boom cylinder 7. Furthermore, in a state in which a rear part floating motion occurs, i.e., in a case in which a state of the shovel 100 is a rear part floating unstable state, or in a state in which an oscillation motion occurs, i.e., in a case in which a state of the shovel 100 is an oscillation unstable state, the pressure in the bottom side oil chamber of the boom cylinder 7 becomes excessive. Accordingly, the stabilization control unit 303 reduces the pressure in the bottom side oil chamber of the boom cylinder 7. As described above, depending on a type of an unstable motion and an unstable state, by controlling a motion of an attachment in such a manner as to reduce pressure in predetermined one of oil chambers of the boom cylinder 7, the stabilization control unit 303 can suppress occurrence of an unstable motion and an unstable state of the shovel 100.

Specifically, the stabilization control unit 303 relieves one of the excessive pressure of the bottom side oil chamber and the rod side oil chamber of the boom cylinder 7 with the electromagnetic relief valves 70 and 72 based on information on the cylinder pressure of the boom cylinder 7 retrieved from the state detecting device 42. More specifically, the stabilization control unit 303 determines an amount of a control current based on a detected value of the cylinder pressure in the bottom side oil chamber and the rod side oil chamber. The stabilization control unit 303 outputs the determined control current to one of the electromagnetic relief valves 70 and 72 to relieve excessive pressure in one of the bottom side oil chamber and the rod side oil chamber of the boom cylinder 7 with the electromagnetic relief valves 70 and 72. Accordingly, the stabilization control unit 303 can suppress an unstable motion and an unstable state of the shovel 100 and achieve stabilization control of the shovel 100.

The stabilization control unit 303 can similarly suppress an unstable motion corresponding to a topographic unstable state of the shovel 100 (sliding of the lower traveling body 1, floating of the lower traveling body 1, tilting or fluctuation of the vehicle body, oscillation of the vehicle body, etc.).

[The Method of Determining Occurrence of a Dynamic Unstable State, Etc.]

Next, a method of determining presence or absence of occurrence of a dynamic unstable state and presence or absence of an indication of an unstable state by the unstable state determination unit 302 is described.

<The Method for Determining Presence or Absence of Occurrence of the Dynamic Unstable State>

First, a method of determining whether a dynamic unstable state of the shovel 100 occurs by the unstable state determination unit 302 is described.

For example, the unstable state determination unit 302 determines that a dynamic unstable state has occurred in the shovel 100 upon detecting that an unstable motion has occurred in the shovel 100, and the unstable state determination unit 302 determines that an unstable state has not occurred in the shovel 100 upon detecting that an unstable motion has not occurred in the shovel 100.

At this time, the unstable state determination unit 302 may determine whether the shovel 100 slides forward or backward based on detected information on a motion state of the vehicle body input from the state detecting device 42. The unstable state determination unit 302 may determine whether the front part or the rear part of the shovel 100 floats based on detected information on a tilt state of the vehicle body input from the state detecting device 42.

For example, the unstable state determination unit 302 determines that an unstable state occurs in the shovel 100 upon detecting that an index value representing the stability of a motion of the shovel 100 ("dynamic stability index value," hereinafter) exceeds a predetermined threshold value in a direction in which the shovel 100 becomes unstable.

At this time, the dynamic stability index value may be a physical quantity related to a state of the shovel 100 which has a relatively high correlation with a dynamic unstable state of the shovel 100 (e.g., the cylinder pressure in the rod side oil chamber of the boom cylinder 7, in a case of the front part floating unstable state). The dynamic stability index value may be calculated as total stability based on at least one of information on the centroid of the shovel 100, information on the tilt state of the vehicle body, information on the position of the bucket 6 relative to the vehicle body, information on an operating state of an attachment in the operation device 26, information on a direction of the crawler, and information on reaction force applied to the vehicle body (the upper turning body 3) from an attachment (for example, detected information on the cylinder pressure of the boom cylinder 7).

<The Method of Determining Presence or Absence of an Indication of a Dynamic Unstable State>

Next, a method of determining, by the unstable state determination unit 302, whether an indication of an unstable state of the shovel 100 occurs is described.

For example, the unstable state determination unit 302 determines that an indication of a dynamic unstable state of the shovel 100 occurs in response to detecting that stabilization control by the stabilization control unit 303 is activated. It can be considered that the stabilization control is activated when a state of the shovel 100 is close to a dynamic unstable state, i.e., when stability on a motion of the shovel 100 is lowered. Furthermore, as a precondition, the unstable state determination unit 302 may determine that an indication of an unstable state of the shovel 100 occurs upon detecting that stabilization control by the stabilization control unit 303 is activated after dynamic stability of the shovel 100 transitions in a direction in which the dynamic stability is lowered (i.e., a direction in which the dynamic stability index value approaches the predetermined threshold value from the stable side). In this case, as described above, the unstable state determination unit 302 may monitor the transition of the dynamic stability index value of the shovel 100. The unstable state determination unit 302 may determine that an indication of a dynamic unstable state occurs when the dynamic stability index value of the shovel 100 moves from the stable side toward the predetermined threshold value and the dynamic stability index value of the shovel 100 is relatively close to the predetermined threshold value.

For example, the unstable state determination unit 302 determines whether an indication of an unstable state occurs in the shovel 100 in consideration of a specific working condition (for example, an operating condition illustrated in FIG. 5 through FIG. 9) of the shovel 100 in which an unstable motion may occur. Specifically, the unstable state determination unit 302 may determine whether an indication of an unstable state occurs in the shovel 100 by comparing a specific situation (a situation of the shovel 100 itself or a situation in the vicinity the shovel 100) in which the above-described unstable state can occur with a current situation (a situation of the shovel 100 itself or a situation in the vicinity the shovel 100). In particular, it is difficult to predict, from a state of the shovel 100, occurrence of an indication of an unstable state of the shovel 100 caused by an external factor other than an operation of an attachment by an operator. In this regard, the unstable state determination unit 302 can determine presence or absence of an indication of an unstable state by utilizing information on a specific topographic condition and a connection mode of an end attachment, etc.

[Specific Example of the Unstable State Log Related Information]

Next, a specific example of the unstable state log related information generated by the management device 200 (the log related information generating unit 2102) and displayed on the display device 340 of the support device 300 is described with reference to FIG. 11 to FIG. 18.

The unstable state log related information illustrated in FIG. 11 through FIG. 18 may obviously be displayed on the display device 240 of the management device 200. Accordingly, an administrator, etc., of the management device 200 can refer to the unstable state log related information. As a result, the effects that are the same as those of a case in which the information is displayed on the support device 300 can be obtained.

<Specific Example of the Unstable State Log Record Extraction Information>

FIG. 11 is a diagram illustrating a first example of the unstable state log related information displayed on the display device 340 of the support device 300. Specifically, FIG. 11 is a diagram illustrating an example of unstable state log record extraction information.

As illustrated in FIG. 11, in the example, the unstable state log record extraction information (a list) is displayed on the display device 340 of the support device 300, which is obtained by extracting unstable state log information at a round with operator identification information corresponding to "operator A" from the unstable state log history information stored in the log information DB2100A of the management device 200. Accordingly, a user of the support device 300 can selectively check the unstable state log information on the shovel 100 operated by the specific "operator A." In addition, a user of the support device 300 may analyze a tendency, etc., in the unstable state log information on the shovel 100 operated by the specific "operator A."

In this example, a user of the support device 300, for example, sets up a condition such that the operator specific information is limited to the "operator A" on an operation screen for retrieving log related information displayed on the display device 340 through the operation device 340. Accordingly, the support device 300 (the log related information retrieving unit 3101) transmits a log related information retrieving request including specification information corresponding to the set condition to the management device 200, and the management device 200 (the log related information generating unit 2102) generates the unstable state log extraction information (a list) according to the example. The list of the example is delivered from the management device 200 (the log related information delivery unit 2103) to the support device 300, and the support device 300 (the log related information display processing unit 3102) displays the delivered list on the display device 340.

Similarly, the unstable state log record extraction information may be generated based on condition setting for types of information (e.g., date and time information) other than the operator specific information. The unstable state log record extraction information may be generated based on conditions on a respective plurality of types of information (for example, the date and time information is "Monday" and the weather information is "clear" etc.).

In the example, the unstable state log record extraction information includes only some types of information among all types of information recorded as the unstable state log information. Specifically, the peripheral environment information is limited to the date and time information, weather information, and the location information, and the shovel related information is limited to the work type information, the unstable state type information, the operation state information, and the activation information of the stabilization control information. As a result, a user of the support device 300 can cause the display device 340 to display only the type of information to be continued by a predetermined operation on the operation device 330, thereby enhancing the convenience of the user. In this case, the support device 300 (the log related information display processing unit 3102) may cause the display device 340 to display a list in which some types of information from the unstable state log record extraction information including all types of information are omitted. The support device 300 (the log related information retrieving unit 3101) may transmit, to the management device 200, a log related information retrieving request including specification information that selects only a part of the information from all types of information according to an operation on the operation screen for retrieving log related information by a user.

<Specific Example of the Unstable State Log Statistical Information>

Figure 12:
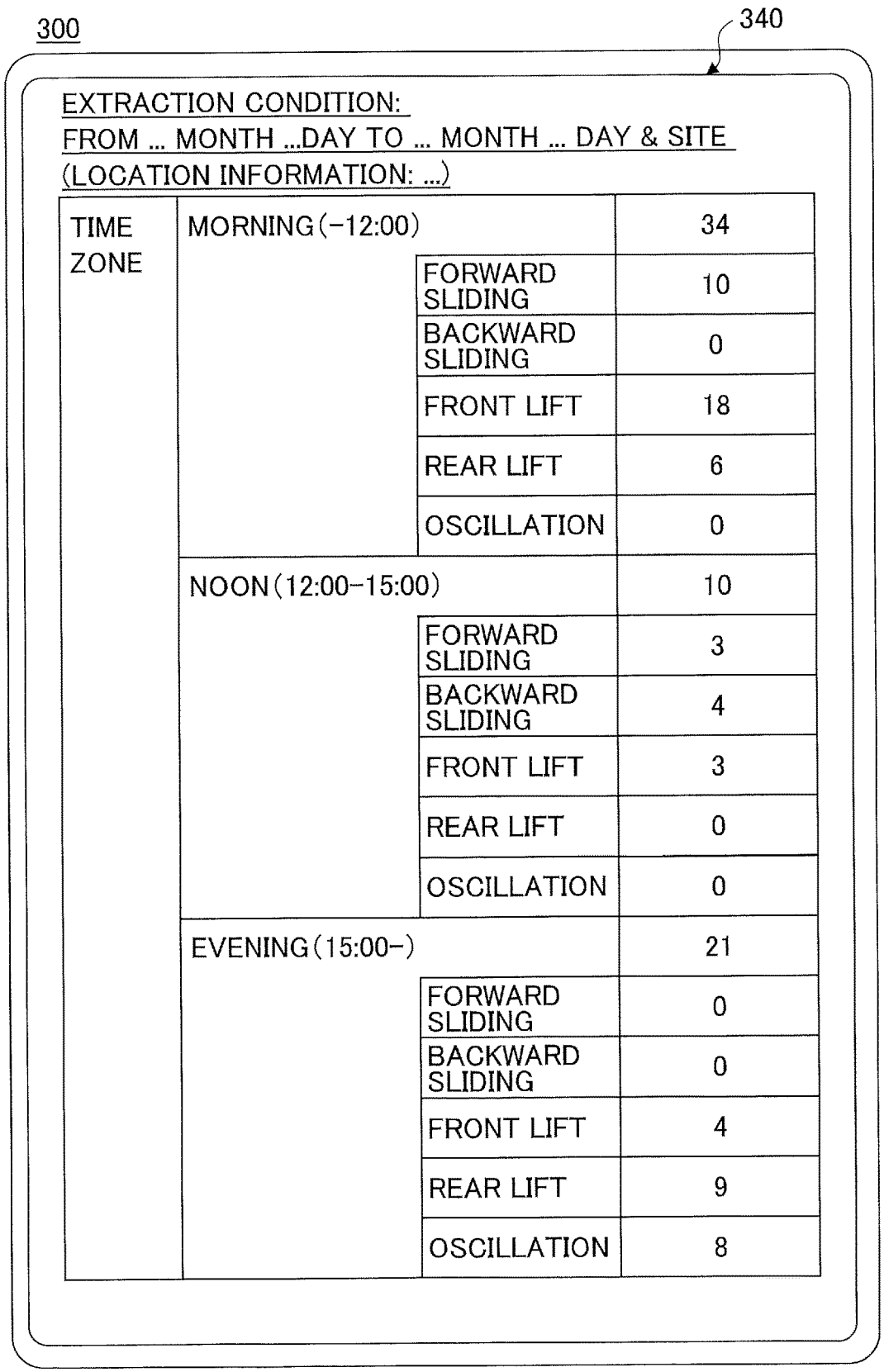
FIG. 12 is a diagram illustrating a second example of unstable state log related information (a first example of unstable state log statistical information) displayed on a display device of a support device.

Next, FIG. 12 is a diagram illustrating a second example of the unstable state log related information displayed on the display device 340 of the support device 300. Specifically, FIG. 12 is a diagram illustrating a first example of the unstable state log statistical information.

As illustrated in FIG. 12, in the example, the unstable state log statistical information is based on unstable state log information extracted by an extraction condition including a condition on the date and time information ("from . . . date . . . month to . . . date . . . month) and a condition on the location information (" . . . site") from the unstable state log record information stored in the log information DB2100A of the management device 200. Furthermore, apparently, the extraction conditions may include a condition on a type of information other than the data and time information and the location information. The same applies to the unstable state log statistical information illustrated in FIG. 13 to FIG. 17 below.

Specifically, in the example, the display device 340 of the support device 300 displays the unstable state log statistical information representing a frequency (a number of times) of occurrence or indications of the unstable state of the shovel 100 for each time zone classified by "morning" (before 12 o'clock), "day" (between 12 o'clock and 15 o'clock), and "evening" (after 15 o'clock). Accordingly, a user of the support device 300 can confirm or analyze a tendency, such as a correlation between a time zone and occurrence or an indication of an unstable state of the shovel 100.

In the example, the display device 340 of the support device 300 displays the unstable state log statistical information including, for each type of the unstable state, details of the frequency (the number of times) of occurrence or indications of the unstable state of the shovel 100 for each time zone. Accordingly, a user of the support device 300 can confirm or analyze, for each type of the unstable state, a tendency, such as a correlation between a time zone and occurrence or an indication of the unstable state of the shovel 100.

In this example, a user of the support device 300, for example, sets a condition for the date and time information and the location information and selects a type of the unstable state log statistical information on the operation screen for retrieving log related information displayed on the display device 340 through the operation device 330. As a result, the support device 300 (the log related information retrieving unit 3101) transmits a log related information retrieving request including specification information corresponding to the set condition to the management device 200, and the management device 200 (the log related information generating unit 2102) generates unstable state log statistical information conforming to the specification information. The unstable state log statistical information is delivered from the management device 200 (the log related information delivery unit 2103) to the support device 300, and the support device 300 (the log related information display processing unit 3102) displays the delivered unstable state log statistical information on the display device 340. In the following, the same applies to the case of the unstable state log statistical information illustrated in FIG. 13 through FIG. 17.

Similarly, the display device 340 of the support device 300 may display the unstable state log statistical information representing a frequency (a number of times) of occurrence or indications of the unstable state of the shovel 100 for each conditional division (e.g., classification for weather information such as "clear," "cloudy," "rain," or "snow") for a type of information of the peripheral environment information other than the date and time information.

Figure 13:
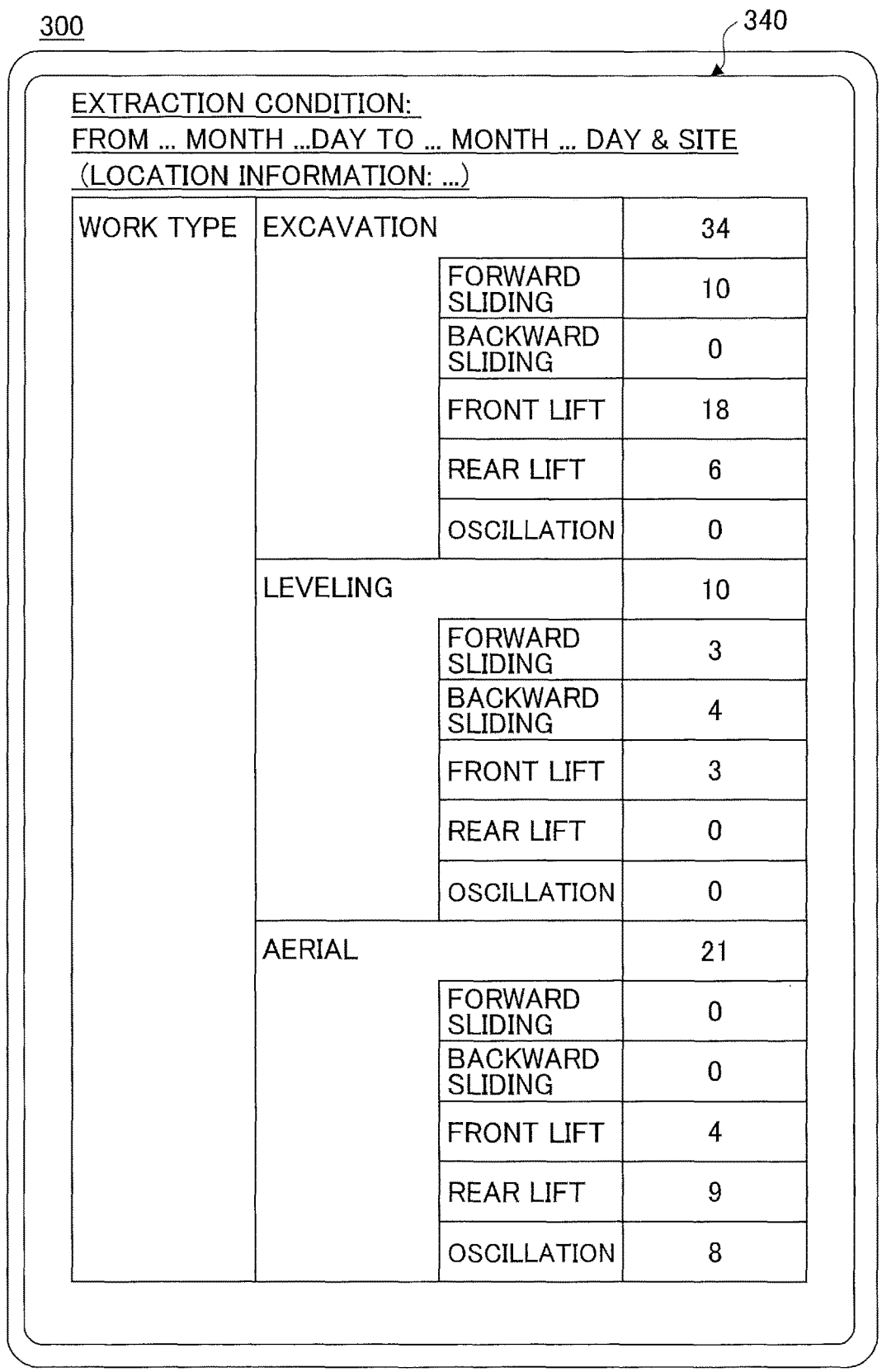
FIG. 13 is a diagram illustrating a third example of unstable state log related information (a second example of unstable state log statistical information) displayed on a display device of a support device.

Subsequently, FIG. 13 is a diagram illustrating a third example of the unstable state log related information displayed on the display device 340 of the support device 300. Specifically, FIG. 13 is a diagram illustrating a second example of the unstable state log statistical information.

As illustrated in FIG. 13, in the example, the display device 340 of the support device displays the unstable state log statistical information representing a frequency (a number of times) of occurrence or indications of the unstable state of the shovel 100 for each work type performed by the shovel 100. Accordingly, a user of the support device 300 can confirm or analyze a tendency, such as a correlation between a work type of the shovel 100 and occurrence or an indication of an unstable state of the shovel 100.

In the example, similar to the example of FIG. 12, the display device 340 of the support device 300 displays the unstable state log statistical information including details, for each type of the unstable state, of the frequency (the number of times) of occurrence or indications of the unstable state of the shovel 100 for each work type of the shovel 100. Accordingly, a user of the support device 300 can confirm or analyze, for each type of an unstable state, a tendency, such as a correlation between a work type of the shovel 100 and occurrence or an indication of an unstable state of the shovel 100.

Similarly, the display device 340 of the support device 300 may display the unstable state log statistical information representing a frequency (a number of times) of occurrence or indications of the unstable state of the shovel 100 for each conditional division (e.g., classification on operator identification information, such as "Operator A," "Operator B," . . . , etc.) on a type of the information of the shovel related information other than the work type information of the shovel 100.

Subsequently, FIG. 14 is a diagram illustrating a fourth example of the unstable state log related information displayed on the display device 340 of the support device 300. Specifically, FIG. 14 is a diagram illustrating a third example of the unstable state log statistical information.

As illustrated in FIG. 14, the display device 340 of the support device 300 displays the unstable state log statistical information representing a ratio of a number of times of activating the stabilization control with respect to the total number of times of occurrence or indications of the unstable state of the shovel 100. Accordingly, a user of the support device 300 can confirm a ratio of activation of the stabilization control with respect to the occurrence or the indications of the unstable state of the shovel 100. Accordingly, for example, a user of the support device 300 (specifically, a developer of the shovel 100, etc.) can analyze whether the stabilization control is operating properly, and, when the stabilization control is insufficient, the user of the support device 300 can improve the stabilization control, such as adjustment of the control parameters.

In the example, the display device 340 of the support device 300 displays, for each type of the stabilization control ("sliding suppression control", "floating suppression control", and "oscillation suppression control"), the unstable state log statistical information representing a ratio of a number of times of activating the stabilization control among the total number of the unstable sates of the shovel 100 or the indications corresponding to the type of the stabilization control. Accordingly, a user of the support device 300 can confirm, for each type of the stabilization control, a ratio of activation of the stabilization control with respect to the occurrence or the indications of the unstable state of the shovel 100.

Subsequently, FIG. 15 is a diagram illustrating a fifth example of the unstable state log related information displayed on the display device 340 of the support device 300. Specifically, FIG. 15 is a diagram illustrating a fourth example of the unstable state log statistical information.

As illustrated in FIG. 15, in the example, the display device 340 of the support device 300 displays the unstable state log statistical information for comparing the stability index value (the average value) of the shovel 100 during activation of the stabilization control and during deactivation of the stabilization control for each operator ("Operator A" and "Operator B"). Specifically, in the unstable state log statistical information, the stability index value (the average value) of the shovel 100 during activation of the stabilization control and during deactivation of the stabilization control and the deviation thereof are indicated for each operator. Accordingly, a user of the support device 300 can find how far an operation of a particular operator is deviated from an operation standard of the stabilization control in a direction in which the stability decreases, by comparing the stability index value of the shovel 100 during activation of the stabilization control and during deactivation of the stabilization control. Thus, the user of the support device 300 can evaluate whether the operation by the operator tends to cause an unstable state in the shovel 100, and the user of the support device 300 can consider a direction of the improvement of the operation by the operator. Furthermore, the user of the support device 300 can relatively compare, among a plurality of operators, the degree of deviation of the stability index value of the shovel 100 during activation of the stabilization control and during deactivation of the stabilization control, and the user of the support device 300 can consider a direction of improvement of an operation by each operator by considering the result of relative comparison.

In the example, the unstable state log statistical information compares the stability index value (average value) of the shovel 100 during activation of the stabilization control and during deactivation of the stabilization control for each type of the unstable state of the shovel 100 ("forward sliding," "backward sliding," "front floating," and "rear floating"). Thus, a user of the support device 300 can find, for each type of the unstable state of the shovel 100, how far an operation of a particular operator is deviated from an operation standard of the stabilization control in a direction in which the stability decreases. Accordingly, a user of the support device 300 can evaluate whether an operation by an operator tends to cause an unstable state to the shovel 100 for each type of the unstable state of the shovel 100, and the user of the support device 300 can consider a direction of improvement of the operation by the operator.

Subsequently, FIG. 16 is a diagram illustrating a sixth example of the unstable state log related information displayed on the display device 340 of the support device 300. Specifically, FIG. 16 is a diagram illustrating a fifth example of the unstable state log statistical information.

As illustrated in FIG. 16, in the example, the display device 340 of the support device 300 displays, for each operator ("Operator A," "Operator B," and "Operator C"), the unstable state log statistical information representing an average value ("average control amount," hereinafter) of a control amount (e.g., control current to the electromagnetic relief valves 70 and 72) indicating a degree of correction of a motion of an attachment during activation of the stabilization control. As the average control amount increases, the degree of correction of the motion of the attachment by the stabilization control increases. Accordingly, similar to the case of FIG. 15, by finding the average control amount, a user of the support device 300 can evaluate whether the operation by the operator tends to cause an unstable state in the shovel 100, etc., and the user of the support device 300 can consider a direction of improvement of the operation by the operator. In addition, a user of the support device 300 can compare the average control amount during activation of the stabilization control among a plurality of operators, and the user of the support device 300 can consider a direction of improvement of an operation by each operator in consideration of the relative comparison result.

In the example, the unstable stat log statistical information indicates an average control amoung for each type of the unstable state of the shovel 100 ("forward sliding," "backward sliding," "front floating," and "rear floating"). Accordingly, similar to the case of FIG. 15, a user of the support device 300 can evaluate whether the operation by the operator tends to cause an unstable state in the shovel 100 for each type of the unstable state of the shovel 100, and the user of the support device 300 can consider a direction of improvement of the operation by the operator. In this case, the type of the unstable state of the shovel 100 may be a type of a dynamic unstable state or a type of a topographic unstable state. The type of unstable state of the shovel 100 may a type that includes both the dynamic unstable state and the topographic unstable state ("forward sliding," "backward sliding," "front floating," and "rear floating") regardless of the difference between the dynamic unstable state and the topographic unstable state. Furthermore, a type of the unstable state of the shovel 100 may include the above-described oscillation of the vehicle body and tilting of the vehicle body (including fluctuation). Furthermore, the oscillation of the vehicle body may be an oscillation of the vehicle body corresponding to a dynamic unstable state, an oscillation corresponding to a topographic unstable state, or a type including both of them.

Figure 17:
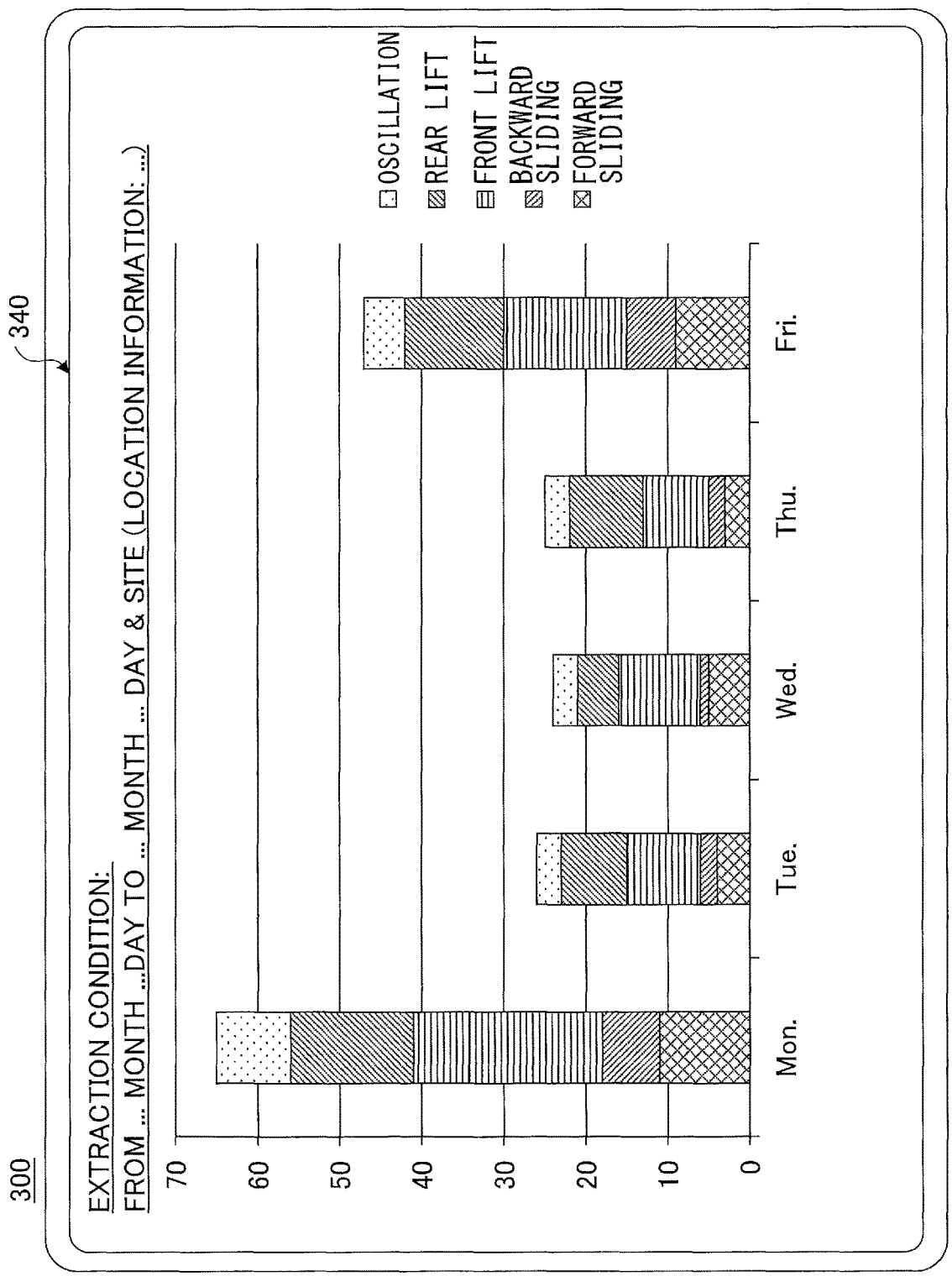
FIG. 17 is a diagram illustrating a seventh example of unstable state log related information (a sixth example of unstable state log statistical information) displayed on a display device of a support device.

Subsequently, FIG. 17 is a diagram illustrating a seventh example of the unstable state log related information displayed on the display device 340 of the support device 300. Specifically, FIG. 17 is a diagram illustrating a sixth example of the unstable state log statistical information.

As illustrated in FIG. 17, in the example, the display device 340 of the support device 300 displays the unstable state log statistical information in which a number of times (a frequency) of occurrence of the unstable state of the shovel 100 or the indications thereof for each day of the week (Monday through Friday) is represented by a bar graph. Specifically, the unstable state log statistical information is the bar graphs, each indicating a number of times (a frequency) of occurrence of the unstable state of the shovel 100 or the indications thereof for the corresponding day of the week including details for each type of the unstable state.

As in this example, the unstable state log statistical information may be represented by graphs, instead of the table. As a result, a user of the support device 300 can be facilitated to visually find the unstable state log statistical information.

<Specific Example of the Unstable State Map Information>

Figure 18:
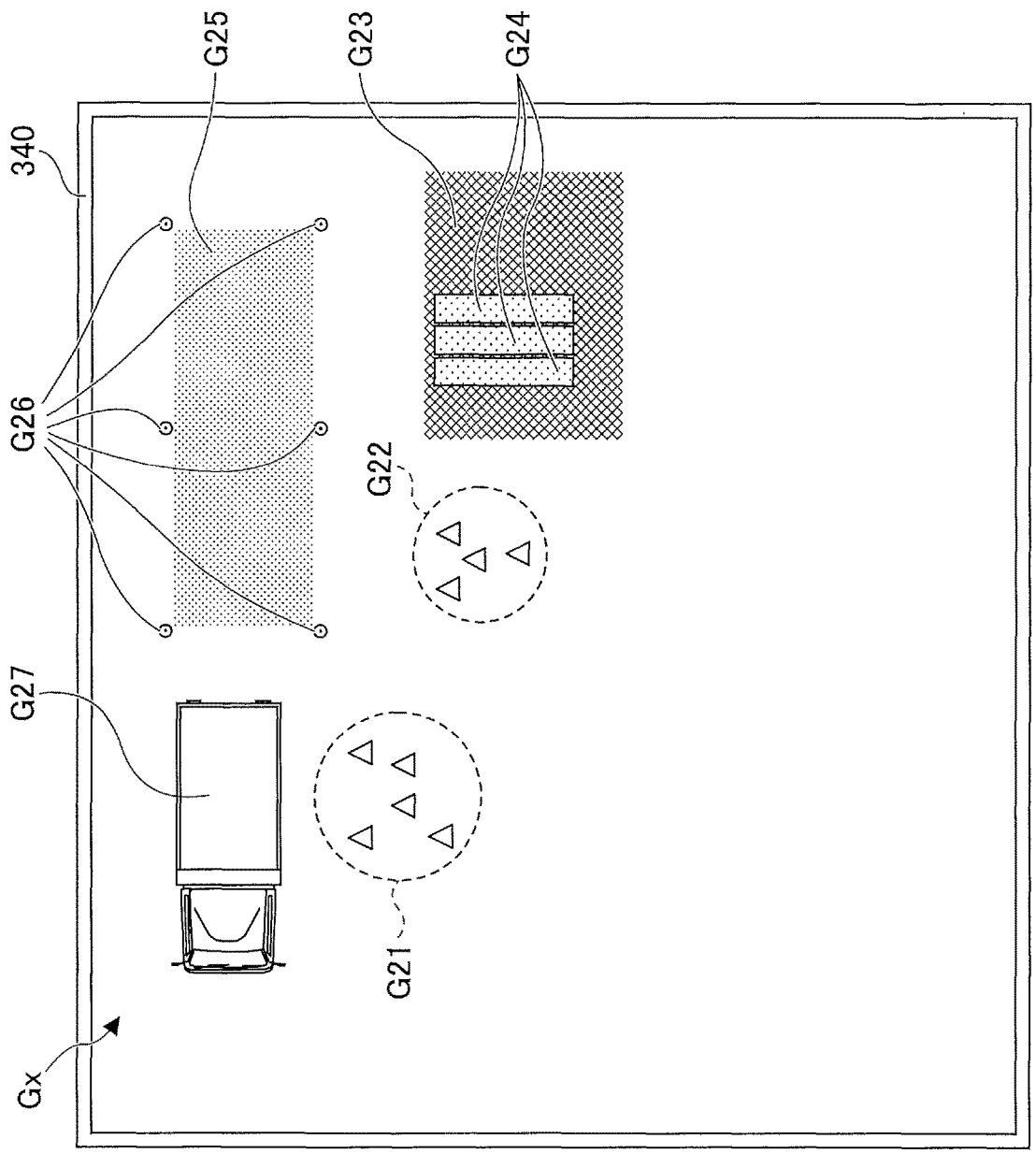
FIG. 18 is a diagram illustrating an eighth example of unstable state log related information (an example of unstable state map information) displayed on a display device of a support device.

FIG. 18 is a diagram illustrating an eighth example of the unstable state log related information displayed on the display device 340 of the support device 300. Specifically, FIG. 18 is a diagram illustrating an example of the unstable state map information (an unstable state map image Gx).

As illustrated in FIG. 18, in the example, the unstable map information image Gx, in which a marker (the Δ in the figure) indicating a location at which a topographic unstable state or an indication thereof occurs is superposed, is displayed on an image of a situation in which a specific work site is viewed from above ("work site image," hereinafter).

Note that the work site image may be a computer graphic, in which a part or all of the image simulates a situation of a work site. Furthermore, a part or all of the work site image may be a synthesized image generated from an image of a work site captured by the imaging device 40 installed in the shovel 100 or an image capturing device installed in the work site.

A material storage image G23 represents a location (material storage) at which materials, such as clay pipes, are temporarily stored in the work site.

A material image G24 represents materials temporarily stored in the material storage area.

A no entry area image G25 represents an area in which entry by the shovel 100 is prohibited (a no entry area). The no entry area is, for example, an area surrounded by load cones. In the no entry area, various operations are usually carried out by workers. In this example, the no entry area image G25 is represented by dot hatching.

A load cone image G26 represents load cones. In this example, the load cone image G26 defines the no entry area.

A dump truck image G27 represents a dump truck that enters the work site and stops. A display position of the dump truck image G27 may correspond to a location at which the dump truck stops at a certain point in time, or may correspond to a stop position of the dump truck defined as a standard position.

Unstable topographic area images G21 and G22 represent areas in which the topographic unstable state of the shovel 100 is relatively likely to occur in the work site, i.e., areas at which a number of times of occurrence of the topographic unstable state of the shovel 100 or the indications thereof is relatively large. Accordingly, a user of the support device 300 can find a location in the work site at which a topographic unstable state tends to occur.

The unstable topographic area image G21 is located adjacent to the dump track image G27. Accordingly, a user of the support device 300 can find that, during loading of soil or the like into the dump truck, a state of the shovel 100 tends to become a topographic unstable state.

The unstable topographic area image G22 is located adjacent to the material storage image G23. Accordingly, a user of the support device 300 can find that a state of the shovel 100 tends to become a topographic unstable state when lifting the material and transporting the material to the material storage or lifting the material from the material storage and transporting the material to the work site.

As described above, a user of the support device 300 can find a location at which a topographic unstable state tends to occur in the work site by confirming the unstable state map information image Gx. Accordingly, when operating the shovel 100, for example, at a location corresponding to the unstable topographic area images G21 and G22 in the work site, a user of the support device 300 can pay close attention, so that a motion of the shovel 100 becomes slower than usual. Furthermore, a user of the support device 300 may set, for example, a control setting in which speed of a motion, etc., of the shovel 100 with respect to an operation on the operation device 26 varies depending on a location of the work site so that a motion of the shovel 100 becomes slower at a location corresponding to the unstable topographic area image G21.

[Specific Example of the Operation Screen for Retrieving Log Related Information]

Next, a specific example of the operation screen for retrieving log related information displayed on the display device 340 of the support device 300 is described with reference to FIG. 19 and FIG. 20.

First, FIG. 19 is a diagram illustrating an example of the operation screen for retrieving log related information (the operation screen for retrieving log related information 1800) displayed on the display device 340 of the support device 300.

As illustrated in FIG. 19, the operation screen for retrieving log related information 1800 includes a selection unit 1801 that selects a list (see FIG. 11) of the unstable state log record extraction information of a predetermined type (specification); and a button icon 1802 for transmitting a log related information retrieving request that includes specification information corresponding to a type selected by the selection unit 1801.

In the selection unit 1801, types of the unstable state log record extraction information extracted by respective different extraction conditions are listed and displayed for each of pre-registered shovel ("shovel A," "shovel B," . . . ).

A user selects, through the operation device 330, the unstable state log record extraction information of a desired type from the list displayed on the selection unit 1801 and operates the button icon 1802. Accordingly, the user can cause the support device 300 to transmit, to the management device 200, a log related information retrieving request for requesting to retrieve desired unstable state log record extraction information.

The selection unit 1801 may be replaced with a list display for selecting the unstable state log statistical information of a predetermined type. Accordingly, a user can cause the support device 300 to transmit, to the management device 200, a log related information retrieving request for requesting to retrieve the unstable state log statistical information of a desired type by performing similar operation through the operation device 330.

Subsequently, FIG. 20 is a diagram illustrating another example (an operation screen for retrieving log related information 1900) of the operation screen for retrieving log related information displayed on the display device 340 of the support device 300.

As illustrated in FIG. 20, the operation screen for retrieving log related information 1900 includes a condition setting unit 1901 for setting an extraction condition for extracting unstable state log record extraction information; and a button icon 1902 for transmitting a log related information retrieving request including specification information corresponding to an extraction condition set by the condition setting unit 1901.

The condition setting unit 1901 lists and displays types of information included in the unstable state log information. A user selects, through the operation device 330, a type of information for which a condition is set on the condition setting unit 1901 and inputs specific details of the setting. At this time, the user can set conditions for a plurality of types of information on the condition setting unit 1901. Accordingly, the user can cause the support device 300 to transmit, to the management device 200, a log related information retrieving request for requesting the unstable state log record extraction information corresponding to a desired extraction condition.

The condition setting unit 1901 may be replaced with a list display for setting a condition related to specification of the unstable state log statistical information. Accordingly, a user can cause the support device 300 to transmit, to the management device 200, a log related information retrieving request for requesting the unstable state log statistical information corresponding to a desired condition setting by performing similar operation through the operation device 330.

Modification/Alteration

While the embodiments of the present invention are described in detail above, the invention is not limited to such specific embodiments, and various modifications and alterations may be made within the scope of the gist of the present invention set forth in the claims.

For example, in the above-described embodiments, the functions of the log related information generating unit 2102 may be transferred from the management device 200 to the support device 300 (an example of the information processing device). In this case, the latest log information DB2100A is appropriately delivered from the management device 200 to the support device 300.

In the above-described embodiments and the modified examples, both the shovel related information and the peripheral environment information are recorded (accumulated) as the unstable state log information. However, only one of the shovel related information and the peripheral environment information may be recorded (accumulated).

In the above-described embodiments and the modified examples, the shovel 100 (controller 30) records the unstable state log information and transmits the unstable state log information to the management device 200. However, the shovel 100 may perform only one of them. Specifically, the controller 30 may upload the information (information corresponding to the unstable state log information) retrieved by the information retrieving unit 304 to the management device 200 each time an unstable state of the shovel 100 occurs, or each time an indication of occurrence of an unstable state of the shovel 100 occurs, and the controller 30 need not record (leave) the unstable state log information. Furthermore, the controller 30 may record the unstable state log information each time an unstable state of the shovel 100 occurs or each time an indication of occurrence of an unstable state of the shovel 100 occurs, and, at the same time, the controller 30 may cause an internal memory or an external storage device that is communicatively connected to accumulate the unstable state log information, without transmitting the unstable state log information outside. In this case, the data corresponding to the unstable state log information may be appropriately read out to an external recording medium by, for example, a service person of the shovel 100, etc. The service person or the like may visit a facility or the like in which the management device 200 is installed and transfer data from the recording medium to the management device 200.

In the above-described embodiments and the modified examples, the unstable state log information is recorded by using the occurrence of an unstable state of the shovel 100 or an indication of an unstable state, as a trigger. However, an event that triggers the recording of the unstable state log information may be any other event. Specifically, the controller 30 may analyze the psychological state of the operator based on the detected information (biometric information) on various states of the operator by the state detecting device 42 and record the log information when a determination is made that the operator encounters a dangerous situation or the like and the operator is scared.

In the above-described embodiments and the modified examples, the shovel 100 is configured to drive various operating elements, such as the lower traveling body 1, the upper turning body 3, the boom 4, the arm 5, the bucket 6, etc., by hydraulic actuators. However, the shovel 100 may be configured to be driven in whole or in part by electric actuators. In this case, the engine 11 may drive a generator to supply power to the electric actuators. The shovel 100 may also include other power sources (e.g., an electrical storage device, such as a battery, a fuel cell, etc.) in place of, or in addition to, the engine 11. That is, the configuration, etc., disclosed in the above-described embodiments may be applied to a hybrid shovel, an electric shovel, etc.

Furthermore, in the above-described embodiments and the modified examples, another working machine may be applied in place of or in addition to the shovel 100. Namely, the management device 200 retrieves and records the log information of various states of the other work machine in place of or in addition to the log information of various states of the shovel 100. The management device 200 may generate information (log related information) for analyzing various states of the other work machine based on the log information (log history information) accumulated through the support device 300 and may provide the information to a user. For example, a work machine including a traveling body, such as a wheel loader, a bulldozer, and a crawler crane; and a work unit attached to the traveling body, or a work machine used at a construction site (construction machine) may be applied.

What is claimed is:

1. A shovel comprising:
   a lower traveling body;
   an upper turning body pivotably attached to the lower traveling body;
   an attachment attached to the upper turning body; and
   a processor that stores in a memory, or transmits to an external device, log information including information on the shovel and information on a peripheral environment of the shovel upon detecting that a degree of stability on a motion of the shovel becomes less than a predetermined reference level, or upon detecting an indication that the degree of stability on the motion of the shovel becomes lower than the predetermined reference level,
   wherein the processor stores in the memory, or transmits to the external device, the log information corresponding to a case in which an index value representing the degree of stability exceeds a predetermined threshold value in a direction in which the degree of stability is lowered.

2. The shovel according to claim 1, wherein a case in which the degree of stability becomes less than the predetermined reference level includes, in a situation in which the lower traveling body is not operated and at least one of the upper turning body and the attachment is operated, a case in which the lower traveling body slides or a case in which the lower traveling body floats from a ground.

3. The shovel according to claim 1, Wherein the processor is further configured to perform, upon detecting that it is likely that the lower traveling body slides or it is likely that the lower traveling body floats from a ground, stabilization control for controlling a motion of the attachment, so that the lower traveling body is prevented from sliding or the lower traveling body is prevented from floating from the ground,
   wherein a case in which there is the indication that the degree of stability becomes less than the predetermined reference level includes a case in which the stabilization control by the processor is activated.

4. The shovel according to claim 1, Wherein a case in which the degree of stability becomes less than the predetermined reference level includes, in a situation in which the lower traveling body travels, a case in which the lower traveling body oscillates, a case in which the lower traveling body slides, or a case in which a part of the lower traveling body floats.

5. The shovel according to claim 1, wherein the degree of stability is determined based on at least one of information on a centroid of the shovel, information on a tilt state of the shovel, information on a position of a bucket of the attachment, information on an operation state of the attachment, information on a direction of the lower traveling body with respect to the upper turning body, and information on reaction force applied from the attachment to the upper turning body.

6. The shovel according to claim 1, wherein the information on the shovel included in the log information includes at least one of identification information of the shovel, identification information of an operator during operation, information on a selected drive mode, information on a revolution number of an engine of the shovel, information on a type of a work that is currently performed, and information on a control state of the shovel.

7. The shovel according to claim 1, wherein the information on the peripheral environment of the shovel included in the log information includes at least one of information on date and time, information on weather, information on a geographical location of the shovel including coordinates of a location of the shovel in a predetermined coordinate system, and a captured image in a vicinity of the shovel captured by an imaging device installed in the shovel.

8. The shovel according to claim 1, wherein information on a state of the shovel included in the log information includes at least one of information on a type of an unstable state of the shovel that occurs when the degree of stability becomes lower than the predetermined reference level, information on a tilt state of the lower traveling body or the upper turning body, information a load applied to a bucket of the attachment, information on an angle between links of the attachment, and information on an operation state of the lower traveling body, the upper turning body, and the attachment.

9. An information processing device comprising:
a processor that retrieves, from a shovel, log information including information on a state of the shovel and information on a peripheral environment of the shovel each time a degree of stability on a motion of the shovel becomes lower than a predetermined reference level, or each time an indication is detected that indicates that the degree of stability on the motion of the shovel becomes lower than the predetermined reference level; and
a memory that stores the log information retrieved by the processor,
wherein the processor generates information related to the log information based on the log information stored in the memory and causes a display device of a user terminal to display the information in a predetermined format, and
wherein the processor generates, based on the log information stored in the memory, statistical information on an unstable state of the shovel in which the degree of stability becomes lower than the predetermined reference level and causes the display device to display the statistical information.

10. The information processing device according to claim 9, wherein, in the memory, a database is constructed in which the log information is arranged so that the log information matching a condition on details of the log can be extracted from a plurality of items of the log information retrieved by the processor each time the degree of the stability becomes lower than the predetermined reference level, or each time the indication is detected that indicates that the degree of stability becomes lower than the predetermined reference level.

11. The information processing device according to claim 9, wherein the processor causes the display device to display from the log information stored in the memory, a list table of the log information matching a condition on one or more types of information of a plurality of types of information included in the log information.

12. The information processing device according to claim 9, wherein the processor generates, based on the log information stored in the memory the statistical information such that a ease in which stabilization control for controlling a motion of an attachment of the shovel is activated so that, under a condition in which it is likely that a lower traveling body of the shovel slides or floats from a ground, the lower traveling body is prevented from sliding or prevented from floating from the ground is compared with a case in which the stabilization control is not activated, and the processor causes the display device to display the statistical information.

13. The information processing device according to claim 9, wherein the processor generates, based on the log information stored in the memory, map information including information on a location of the shovel at a time at which the degree of stability becomes lower than the predetermined reference level or at a time at which there is the indication that the degree of stability becomes lower than the predetermined reference level, and the processor causes the display device to display the map information.

14. An information processing method executed by an information processing device capable of communicating with a shovel, the information processing method comprising:
retrieving, from the shovel, information on a state of the shovel and information on a peripheral environment of the shovel upon detecting that a degree of stability on a motion of the shovel becomes lower than a predetermined reference level, or upon detecting an indication indicating that the degree of stability on the motion of the shovel becomes lower than the predetermined reference level;
storing the information retrieved by the retrieving in a memory,
generating information related to the log information based on the log information stored in the memory and causing a display device of a user terminal to display the information in a predetermined format; and
generating, based on the log information stored in the memory, statistical information on an unstable state of the shovel in which the degree of stability becomes lower than the predetermined reference level and causing the display device to display the statistical information.

15. A non-transitory storage medium storing a program that causes an information processing device capable of communicating with a shovel to execute:
retrieving, from the shovel, information on a state of the shovel and information on a peripheral environment of the shovel upon detecting that a degree of stability on a motion of the shovel becomes lower than a predetermined reference level, or upon detecting an indication indicating that the degree of stability on the motion of the shovel becomes lower than the predetermined reference level;
storing the information retrieved by the retrieving in a memory;
generating information related to the log information based on the log information stored in the memory and causing a display device of a user terminal to display the information in a predetermined format; and
generating, based on the log information stored in the memory, statistical information on an unstable state of the shovel in which the degree of stability becomes lower than the predetermined reference level and causing the display device to display the statistical information.

\* \* \* \* \*